Figure 1:
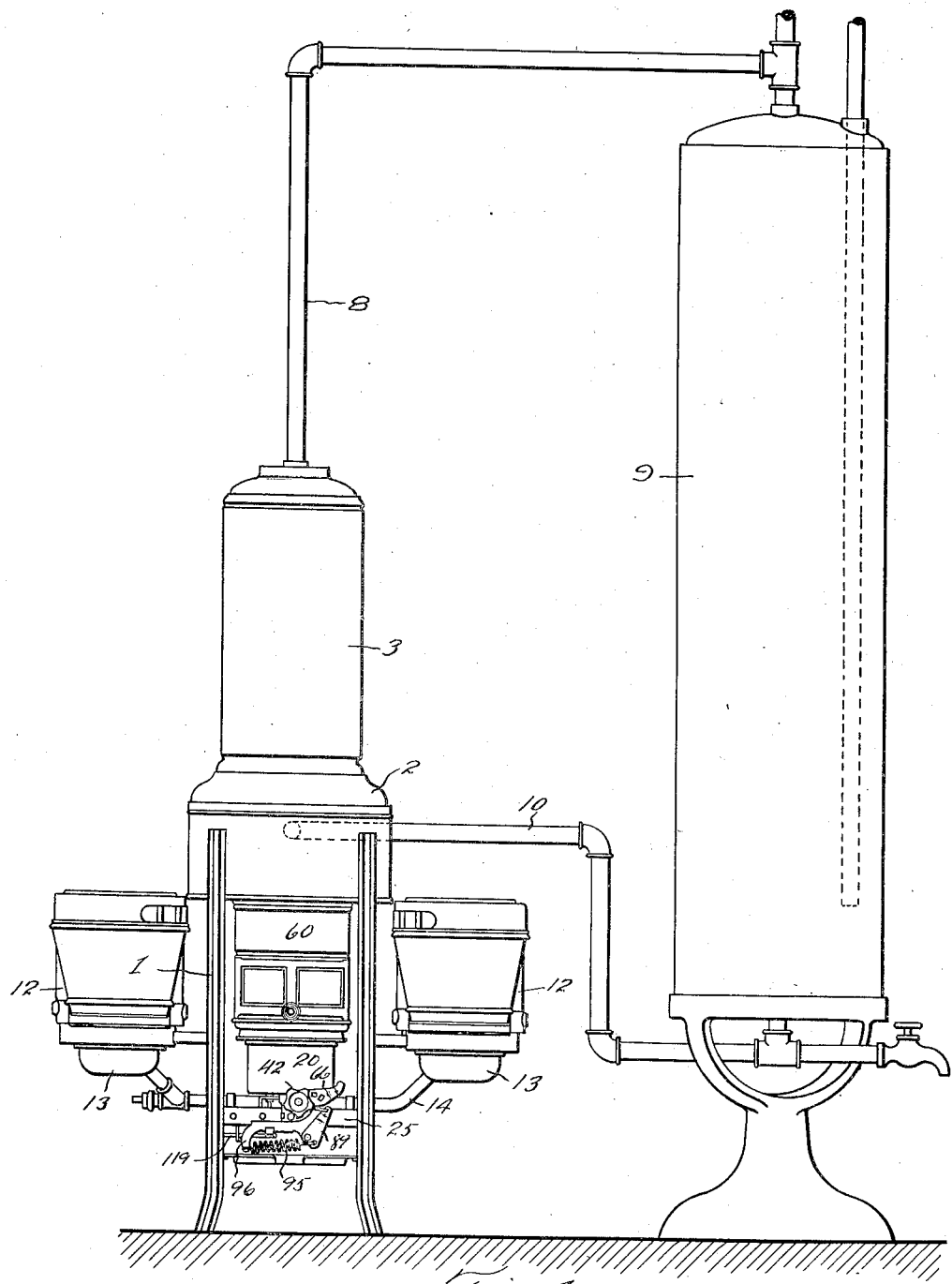

March 16, 1926. 1,576,718
L. S. CHADWICK ET AL
THERMOSTATIC CONTROL FOR HEATING DEVICES
Filed Sept. 26, 1923 14 Sheets-Sheet 3

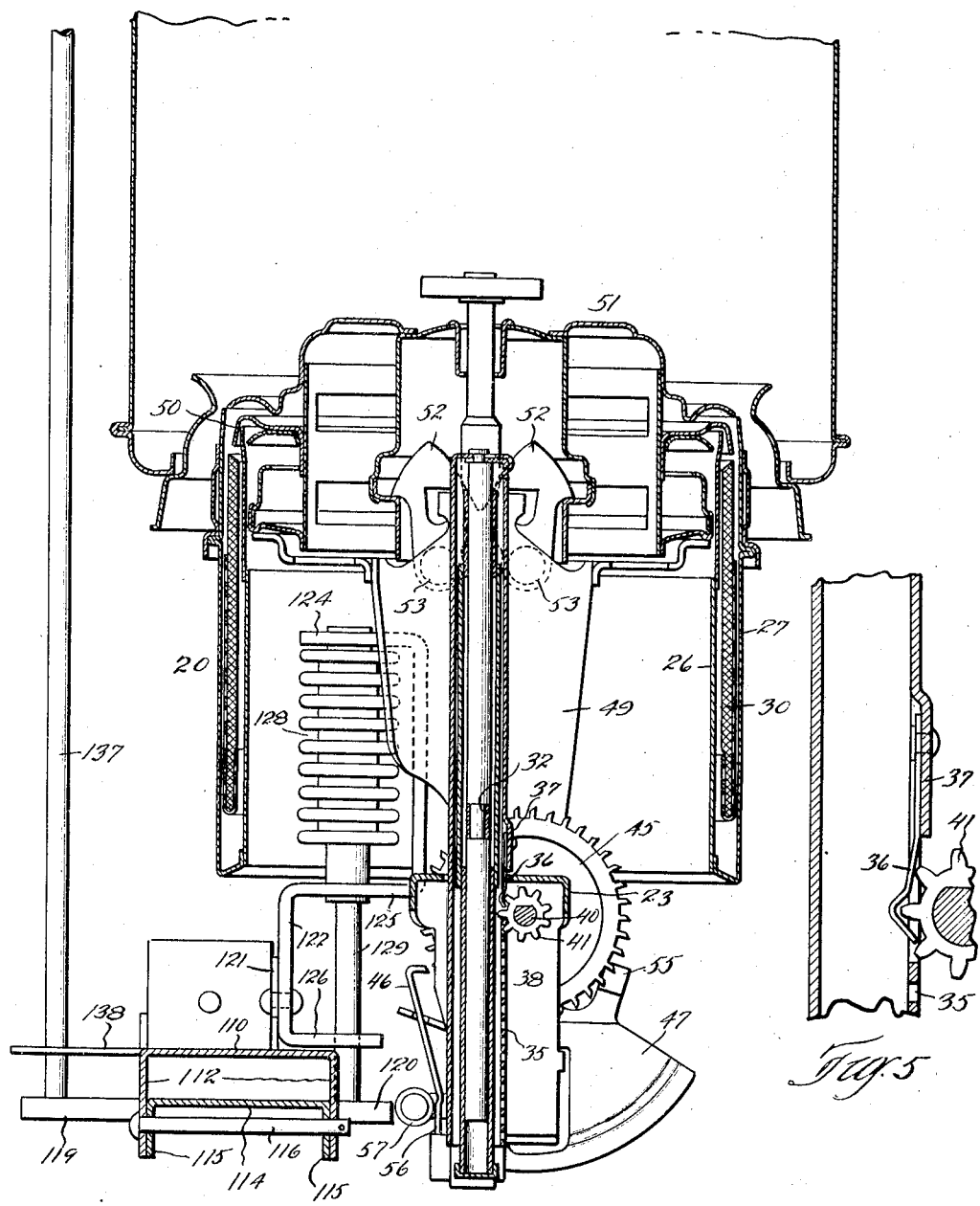

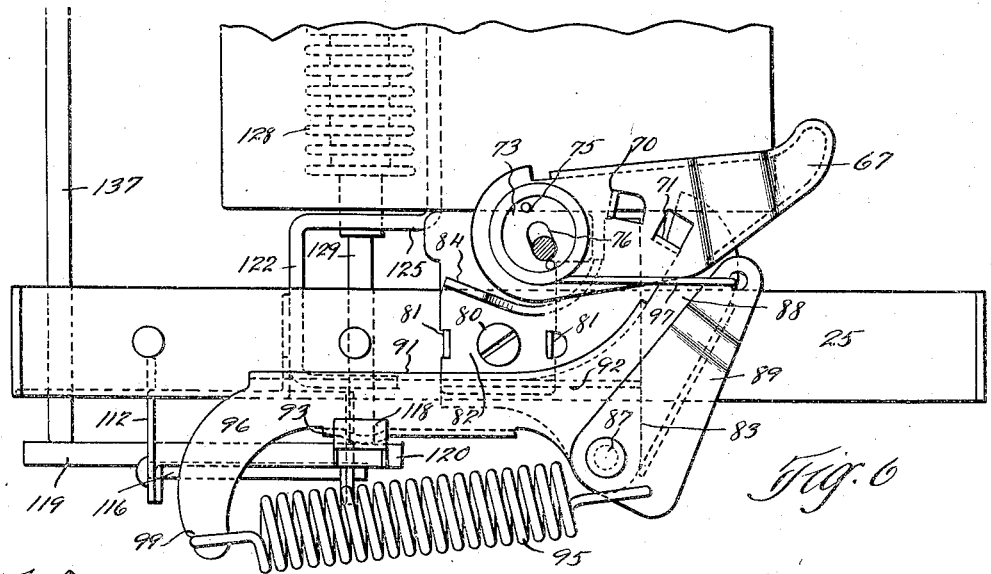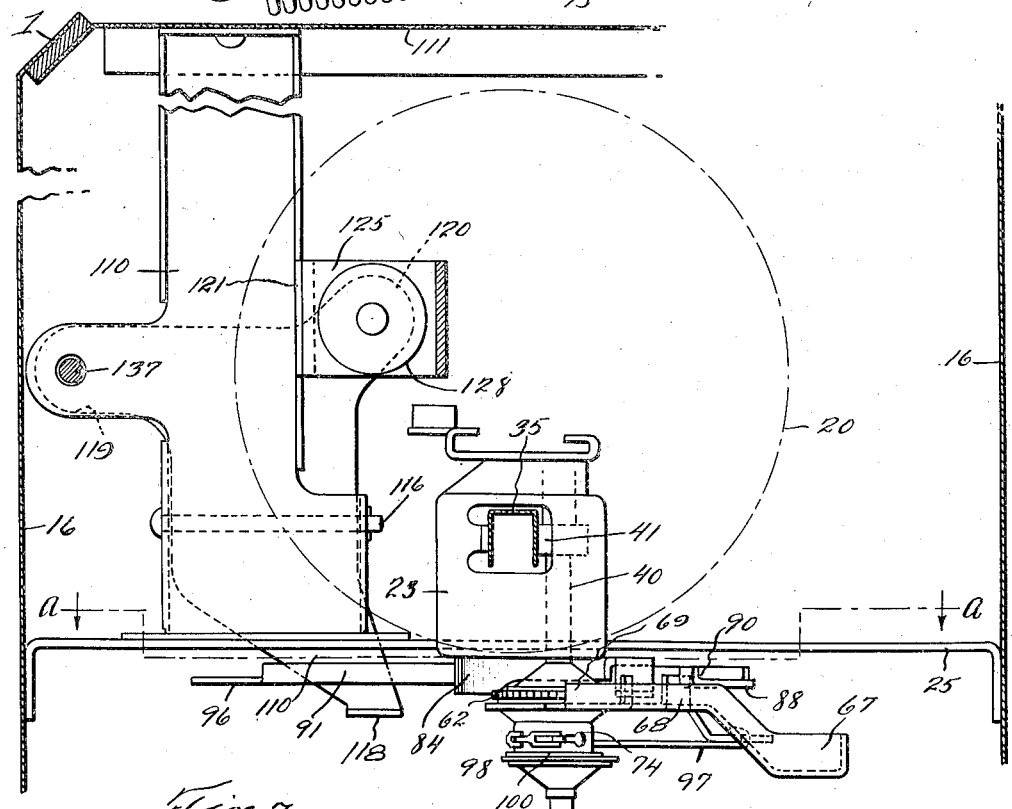

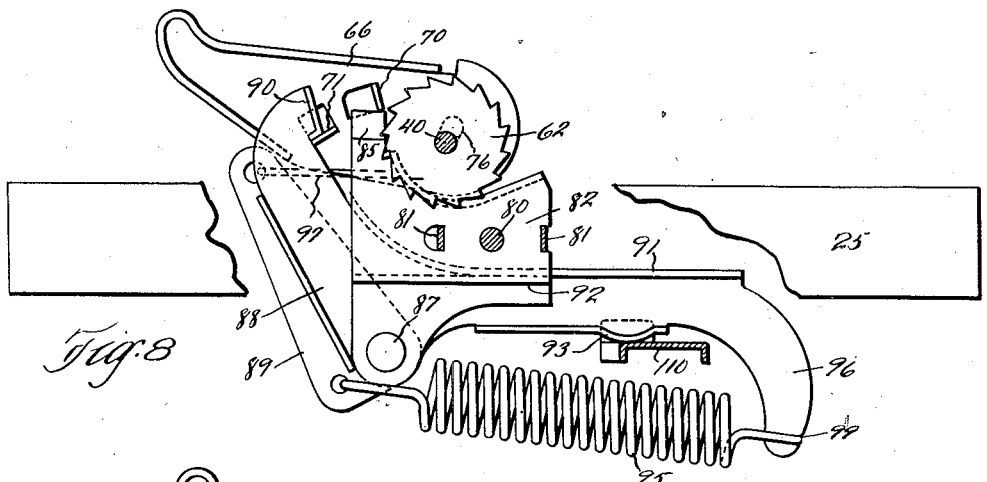

March 16, 1926.

L. S. CHADWICK ET AL 1,576,718

THERMOSTATIC CONTROL FOR HEATING DEVICES

Filed Sept. 26, 1923   14 Sheets-Sheet 7

Inventors
Lee S. Chadwick
Marc Resek
By J. Alger Dahlstrom
Hull, Brock and West Attys.

March 16, 1926.
1,576,718
L. S. CHADWICK ET AL
THERMOSTATIC CONTROL FOR HEATING DEVICES
Filed Sept. 26, 1923   14 Sheets-Sheet 8
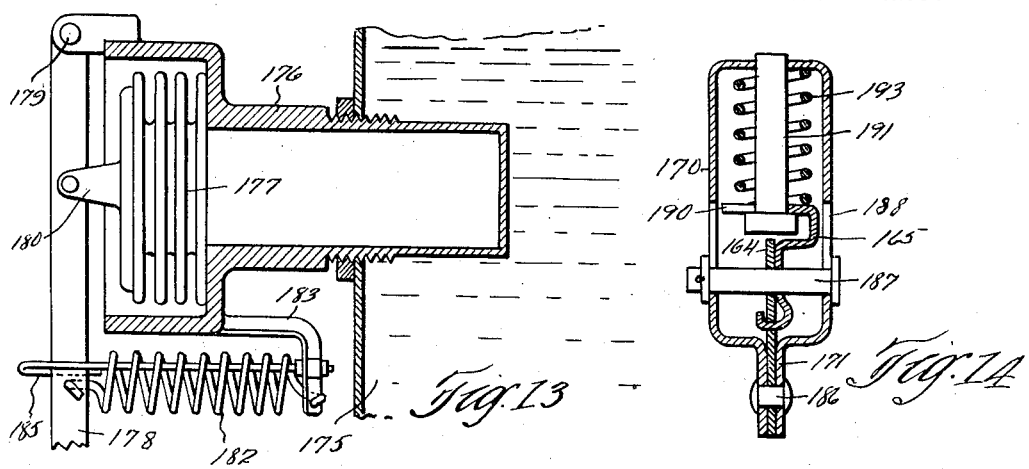
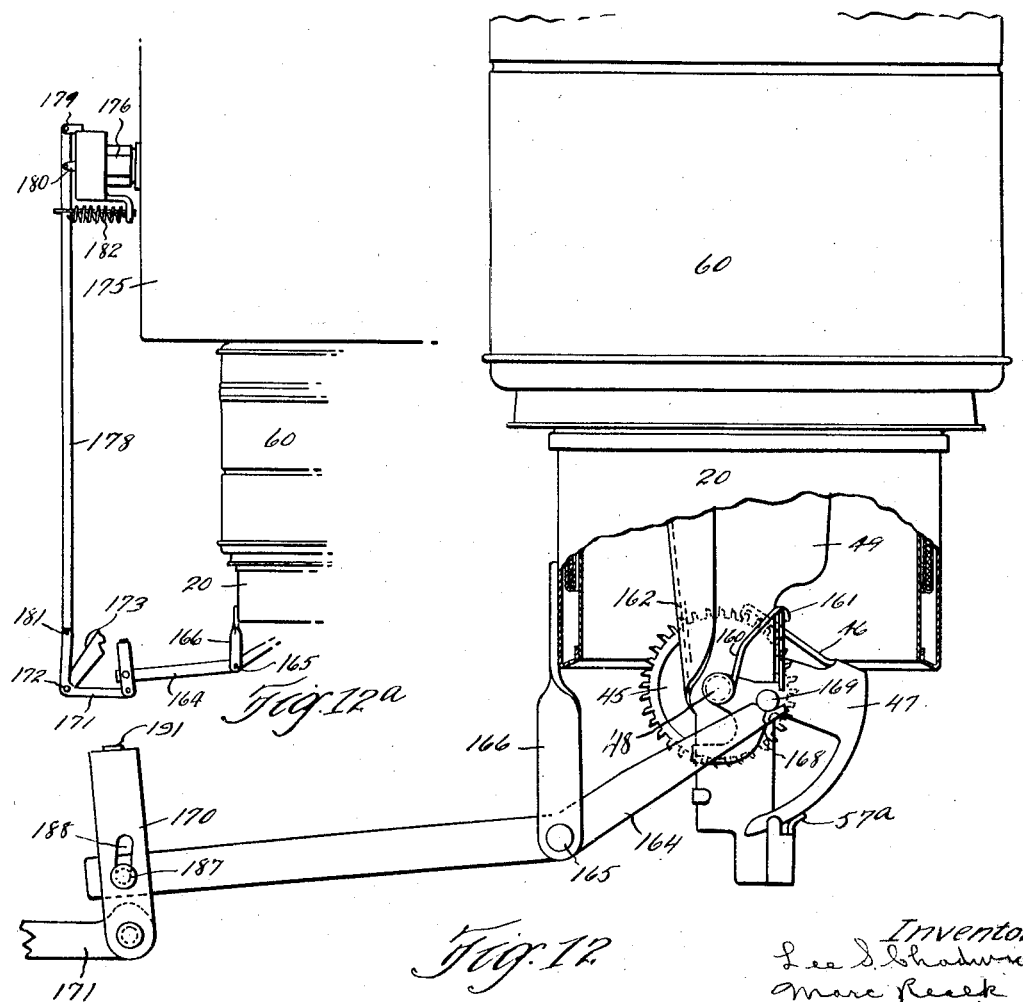

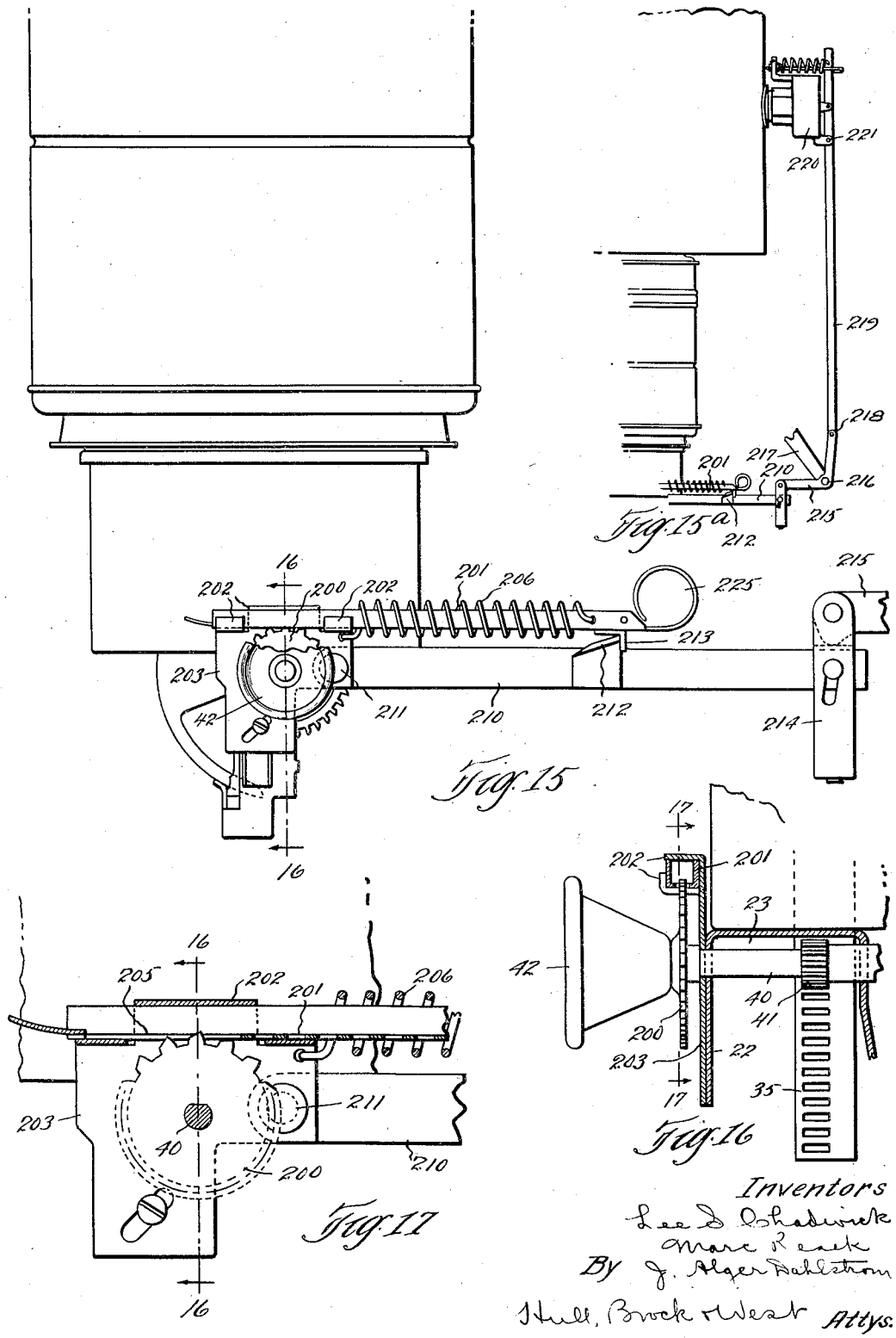

March 16, 1926.
L. S. CHADWICK ET AL
1,576,718
THERMOSTATIC CONTROL FOR HEATING DEVICES
Filed Sept. 26, 1923 14 Sheets-Sheet 10
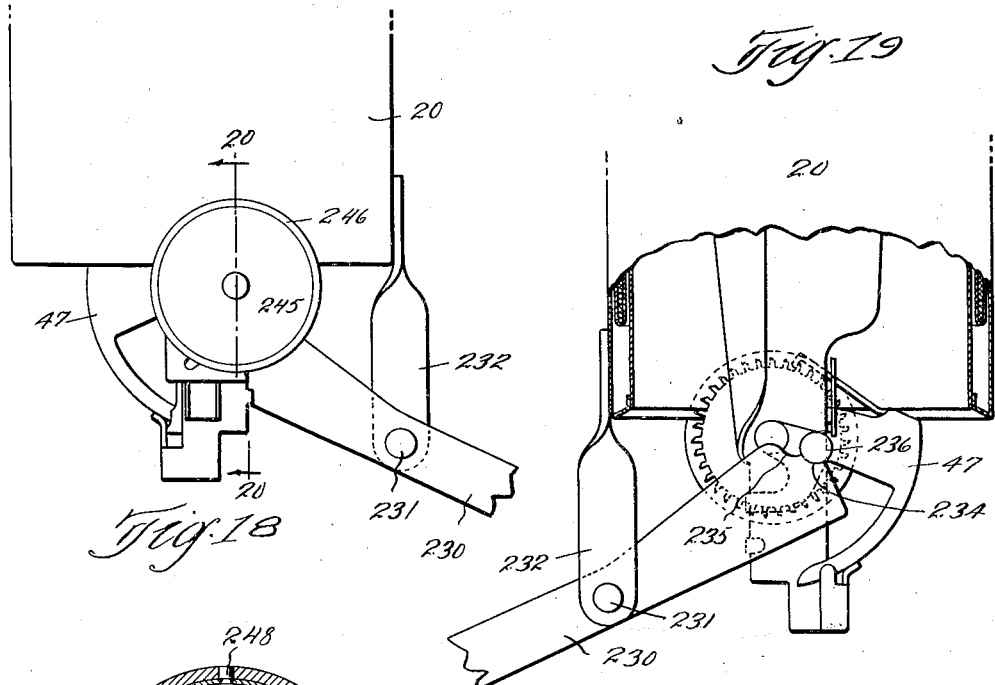
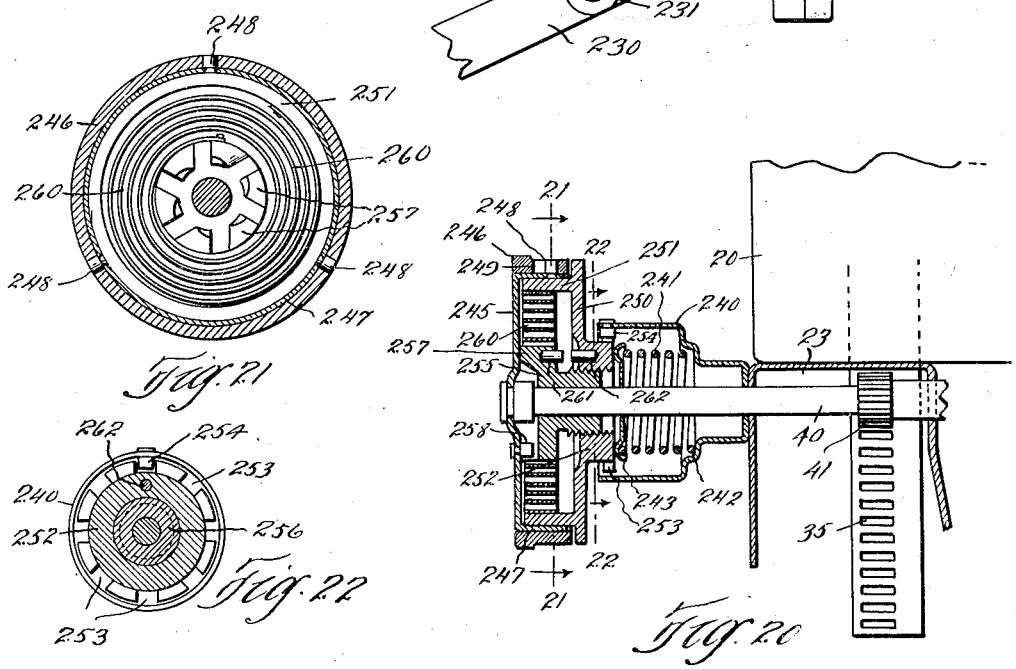
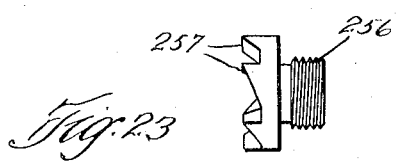

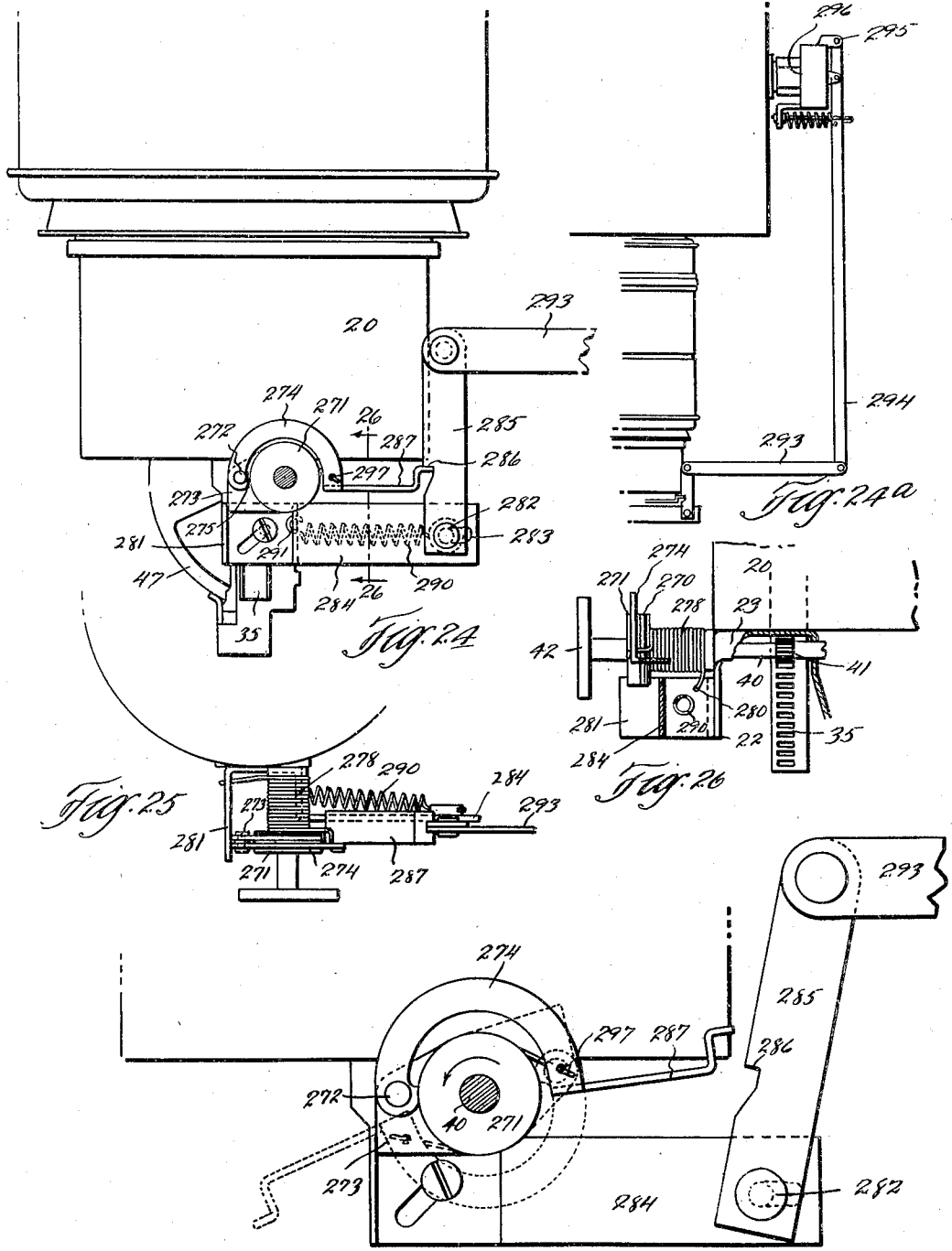

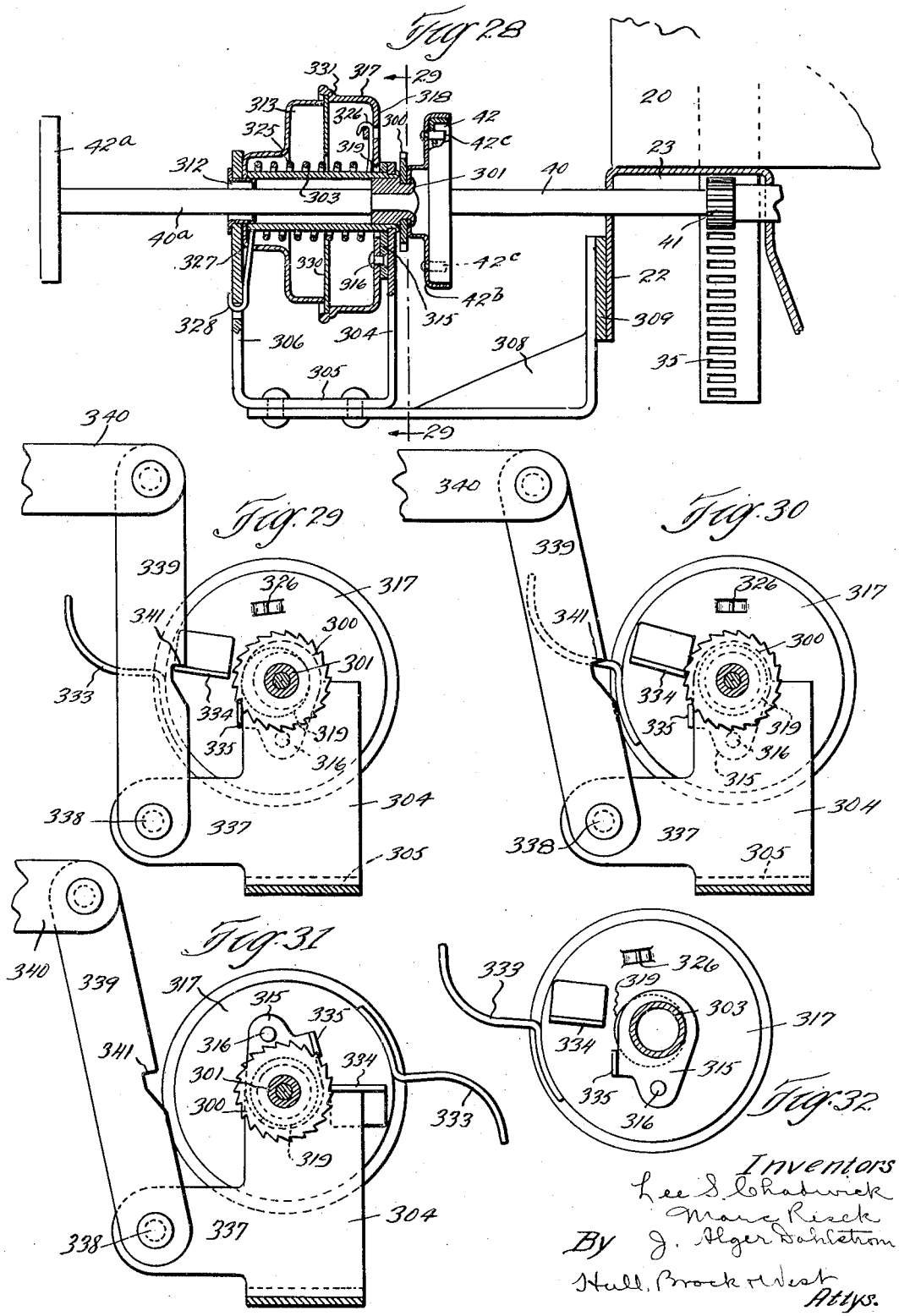

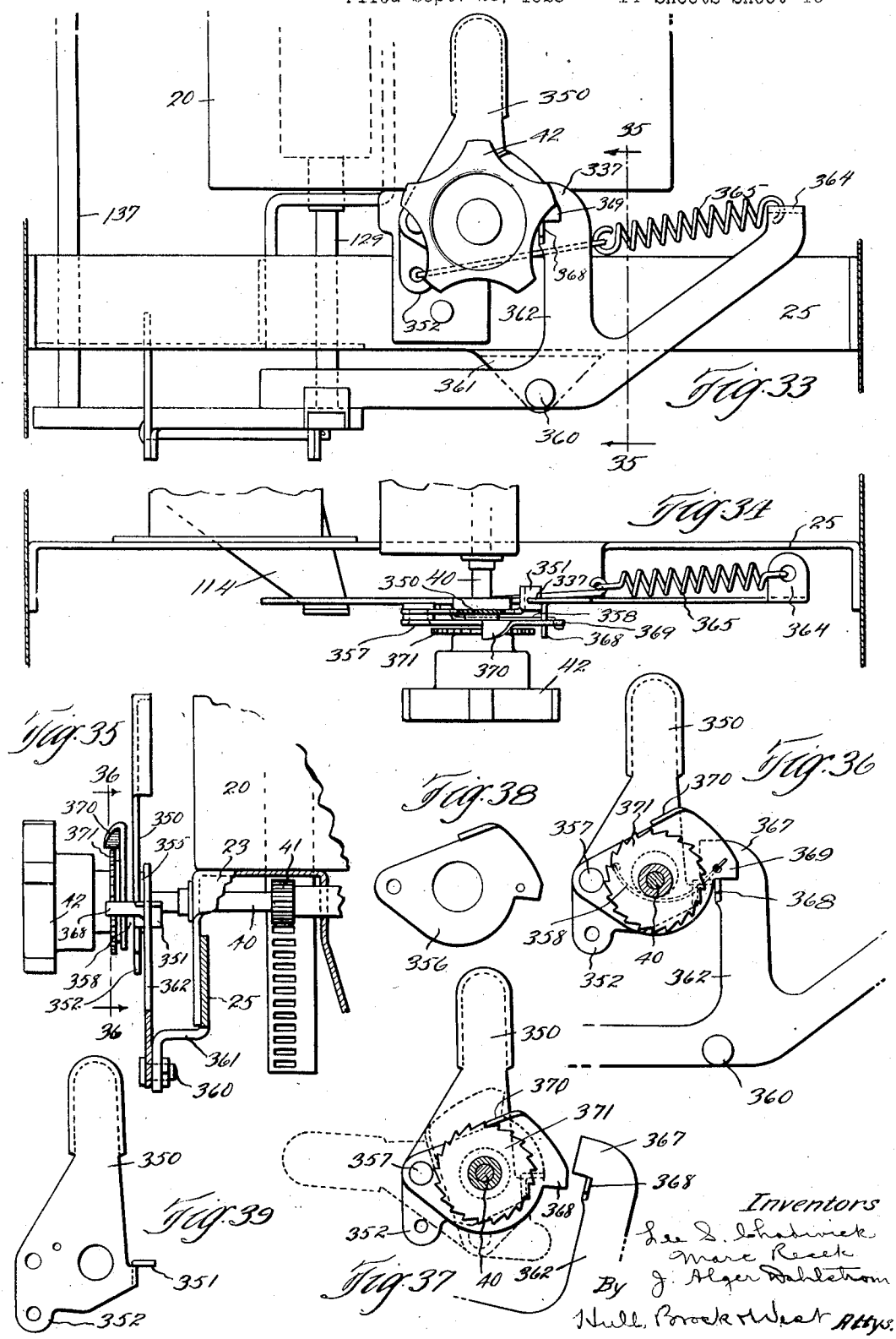

March 16, 1926.                                                          1,576,718
              L. S. CHADWICK ET AL
          THERMOSTATIC CONTROL FOR HEATING DEVICES
              Filed Sept. 26, 1923     14 Sheets-Sheet 14

Fig. 40

Fig. 41

Inventors
Lee S. Chadwick
Marc Resek
By J. Alger Dahlstrum
Hull, Brock & West
Attys.

Patented Mar. 16, 1926.

1,576,718

UNITED STATES PATENT OFFICE.

LEE S. CHADWICK, OF SHAKER HEIGHTS VILLAGE, AND MARC RESEK AND JOHN ALGER DAHLSTROM, OF EAST CLEVELAND, OHIO, ASSIGNORS TO PERFECTION STOVE COMPANY, OF CLEVELAND, OHIO, A CORPORATION OF OHIO.

THERMOSTATIC CONTROL FOR HEATING DEVICES.

Application filed September 26, 1923. Serial No. 664,854.

*To all whom it may concern:*

Be it known that we, (1) LEE S. CHADWICK, (2) MARC RESEK, and (3) JOHN ALGER DAHLSTROM, citizens of the United States, residing at (1) Shaker Heights Village, (2) East Cleveland, and (3) East Cleveland, in the county of Cuyahoga and State of Ohio, have invented a certain new and useful Improvement in Thermostatic Controls for Heating Devices, of which the following is a full, clear, and exact description, reference being had to the accompanying drawings.

The present invention relates to thermostatic means for use with heating devices (such as oil burners, particularly of the wick type) which acts to cause the heat of the device to be reduced (as by turning down the wick) when the temperature of the device, or of the medium heated thereby, becomes excessively high.

The invention is especially suitable for use in connection with water heating apparatus of the class employing oil burners of the type above referred to, and for that reason we have chosen to show it in such connection in the present disclosure.

Burners of the above mentioned type incorporate wick adjusting means, and in the particular burner shown said means involve a spindle which is adapted to be turned in one direction to elevate the wick, and in the opposite direction to lower the wick. As applied to such burners, and in its present preferred form, the invention may be defined broadly as consisting of three major divisions, namely: spring mechanism or an equivalent thereof for lowering the wick; latch for holding said mechanism in "set" position, from which position it moves to effect the lowering of the wick; and thermostatic means for releasing the latch.

In the water heater installations disclosed in the accompanying drawings, two thermostats are employed, one of which is subjected to the temperature of the water in the water heating system, and the other to the temperature of the burner parts. In the broad issue, however, it is immaterial as to what it is whose temperature actuates the thermostat, or whether only one thermostat, or a plurality of thermostats, are included.

The general objects of the invention are to provide reliable thermostatic means that will operate to automatically lower the wick of an oil burner when the temperature of the burner parts or of the medium treated by the burner becomes excessive; to provide means of the aforesaid character that will not interfere with the manual adjustment of the wick; to provide means of said character involving spring mechanism for lowering the wick; a latch for retaining said mechanism in "set" condition, and a thermostat for actuating said latch to release the mechanism and allow it to lower the wick; to provide means of the character just recited that is very convenient of resetting; and to provide mechanism of the foregoing nature that is very substantial and durable, is not liable to get out of order, is so designed and constructed as to expedite and cheapen manufacture, and facilitate assembly and replacement of parts and wherein all parts are readily accessible.

In the preferred form of the invention, the spring mechanism above referred to involves an element which is adapted to be thrown, through a considerable range of movement, by a spring; and a further object is to so proportion and arrange the parts as to effect a substantially uniform action of the spring upon said element throughout the latter's range of movement, thereby to prevent the element from being thrown so hard as to injure either the mechanism or a person whose hand may be in the path of the element when thrown. This also contributes to the ease of re-setting the mechanism because the gradually increasing power of the spring is not transmitted to the element, by means of which the mechanism is re-set.

Figure 2:
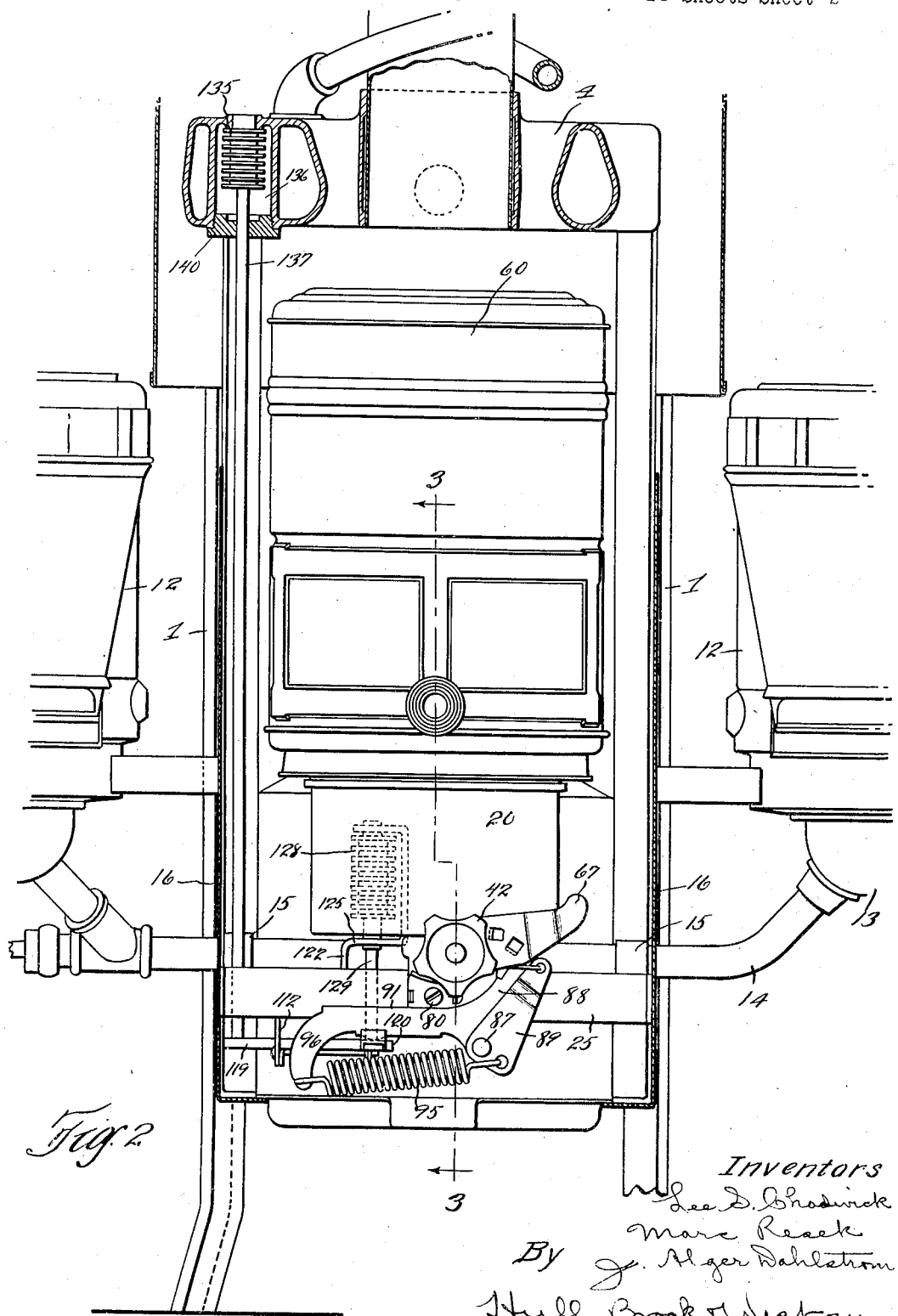
Figure 3:
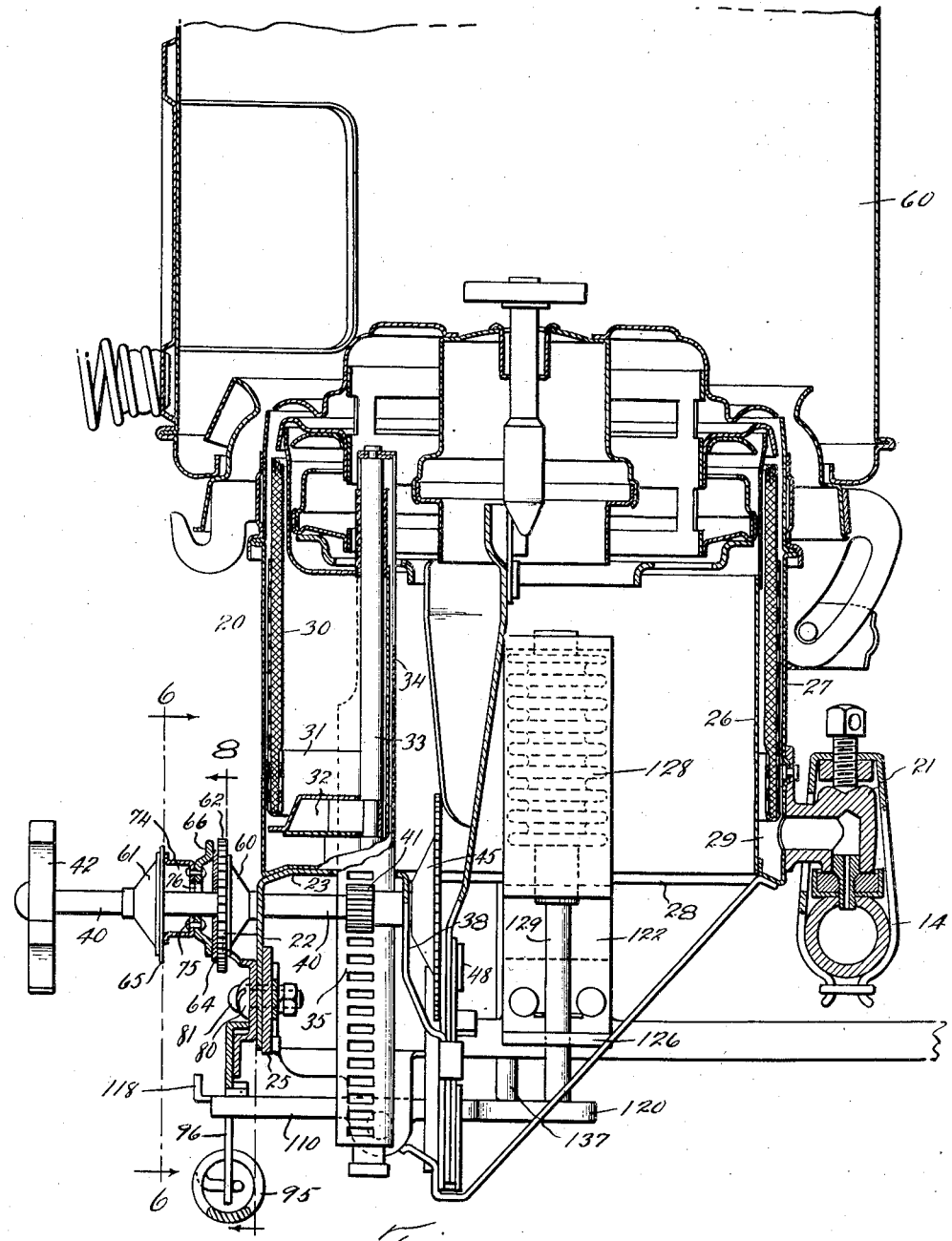
Figure 11:
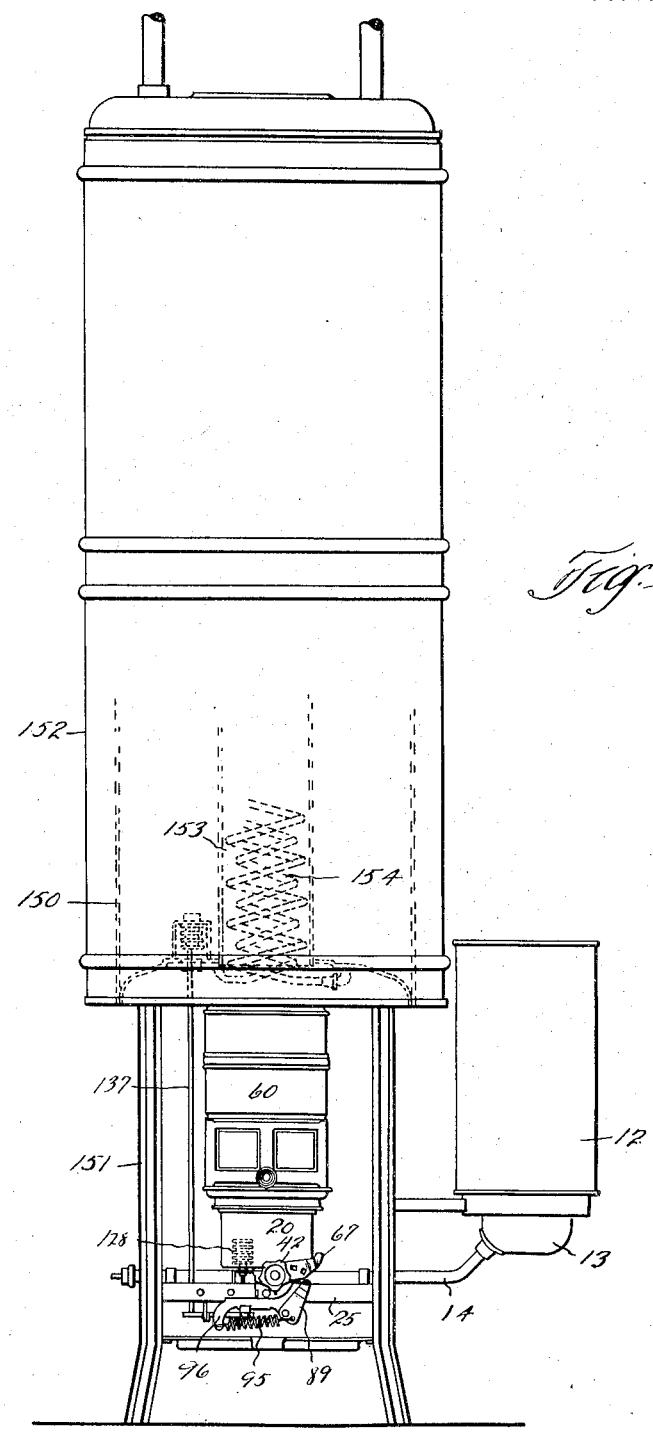

The foregoing objects, with others which will appear as this description proceeds, are attained in the embodiments of the invention illustrated in the drawings accompanying and forming a part hereof and wherein Fig. 1 shows the invention incorporated in a water heater that is fired by a liquid fuel burner and which is in circulatory communication with a range boiler; Fig. 2 is an enlarged sectional front elevation of the water heater in the region of the burner; Fig. 3 is a substantially central vertical section through the burner at right angles to the plane of Fig. 2 and on a somewhat larger scale; Fig. 4 is a vertical section through the burner at right angles to Fig. 3; Fig. 5 is a detail of certain parts shown in Fig. 4; Fig. 6 shows the spring mechanism and parts associated therewith in front elevation and in "set" position, the view being, in effect, a section on line 6—6 of Fig. 3; Fig. 7 is a fragmentary sectional plan through the mechanism on a plane immediately below the burner; Fig. 8 is a section on the line 8—8 of Fig. 3, looking in the direction of the arrows, and showing the spring mechanism "set", as in Fig. 6; Figs. 9 and 10 are similar views of the same parts, the former showing the spring mechanism just released by the latch, and the latter showing it in the position to which it is thrown by the spring; Fig. 11 shows the invention incorporated in a water heater of a different type from that illustrated in Fig. 1; Fig. 12 is a fragmentary sectional rear elevation of a burner embodying a modified form of the invention; Fig. 12ª is a continuation of what is shown in Fig. 12, on a considerably reduced scale, showing the connections between the latch mechanism and the thermostat; Fig. 13 is a detail of the thermostat and associated parts; Fig. 14 is a section on the line 14—14 of Fig. 12; Fig. 15 is a fragmentary front elevation of a burner showing a further modified form of the invention; Fig. 15ª is a continuation of Fig. 15, on a considerably smaller scale, showing the connections between the latch and thermostat; Fig. 16 is a section on the lines 16—16 of Figs. 15 and 17; Fig. 17 is a section on the line 17—17 of Fig. 16; Fig. 18 is a fragmentary front elevation, and Fig. 19 a fragmentary sectional rear elevation of a burner embodying the invention in a further modified form; Fig. 20 is an enlarged section on the line 20—20 of Fig. 18; Figs. 21 and 22 are sections on the respective lines 21—21 and 22—22 of Fig. 20; Fig. 23 is a side elevation of one of the parts involved in the present modification; Fig. 24 is a fragmentary front elevation of a burner equipped with a further modified form of the invention and with the wick adjusting spindle in section; Fig. 24ª is a continuation of Fig. 24, on a considerably reduced scale, showing the connections between the latch and thermostat; Fig. 25 is a plan view of the spring mechanism and latch that are shown in Fig. 24; Fig. 26 is a section on the line 26—26 of Fig. 24; Fig. 27 is a considerably enlarged detail of the spring mechanism and latch, said mechanism being shown in full line as though it had just been released by the latch, and in dotted line in final position to which it is thrown by the spring; Fig. 28 is a vertical section on the axis of the wick adjusting spindle through a modified form of the invention disclosing it attached to a burner that is shown only in part; Fig. 29 is a section on the line 29—29 of Fig. 28 with the spring mechanism retained in ineffective position by the latch; Figs. 30 and 31 are views similar to Fig. 29 showing, respectively, the spring mechanism just released by the latch and the spring mechanism in final position to which it is thrown by the spring; Fig. 32 is a detail of the spring mechanism; Fig. 33 shows, in fragmentary front elevation, a burner equipped with a form of the invention quite similar to that shown in Figs. 1 to 11; Fig. 34 is a sectional plan of what is shown in Fig. 33; Fig. 35 is a section substantially on the line 35—35 of Fig. 33; Fig. 36 is a sectional detail on the line 36—36 of Fig. 35 showing the spring mechanism in "set" position, as in Figs. 33, 34 and 35; Fig. 37 is a detail similar to Fig. 36 showing the spring mechanism in full lines as though just released by the latch, and in dotted lines in final position; Fig. 38 is a detail of the stop and pawl plate; Fig. 39 is a detail of the reset lever; Fig. 40 is a fragmentary sectional side elevation of a burner equipped with another modification of the invention; and Fig. 41 is a sectional detail on the correspondingly numbered line of Fig. 40.

The present preferred form of the invention is illustrated in Figs. 1 to 11. In Figs. 1 to 10 it is shown as incorporated in a water heater disclosed and claimed in an application bearing Serial No. 665,244, filed September 27, 1923, jointly by two of the present applicants, Resek and Dahlstrom together with one Carl C. Rehmer, the case being entitled "Water heating apparatus". In Fig. 11 it is shown as incorporated in a water heater which constitutes the subject matter of another application, Serial No. 664,850, filed on even date herewith jointly by two of the present applicants, Chadwick and Resek, and entitled "Water heating and storage apparatus".

The water heater that is shown complete in Fig. 1, and in part in some of the following views, comprises a stand 1 which includes a shell 2 at its upper end that is surmounted by a drum 3, the shell and drum enclosing the circulating element designated 4 in Fig. 2. The outlet end of the circulating element is connected, through a pipe 8, with the top of a range boiler 9, while the inlet end of said element is connected, through a pipe 10 to the bottom of said boiler. This, in general, is the usual water heating system of the circulation type.

Supported by the stand 1 and on opposite sides thereof, are oil containers 12 that are inverted over distributing receptacles 13 which have connection with a fuel supply pipe 14 that leads through the lower portion of the stand 1 and is connected, by suitable means designated 15, to the side panels 16 of the stand.

A burner 20 has communicative connection with and is supported at its rear side by the fuel supply pipe 14 through an elbow fitting 21 (Fig. 3) usual in burners of this type; and at its forward side the burner is supported, through the front branch 22 of a bracket 23 from a cross member 25 of the stand.

Burners involving the features of the one wherewith we have shown our present invention associated are disclosed in detail in the applications of Lee S. Chadwick, Serial Nos. 528,813 and 602,740, filed respectively on Jan. 12, 1922, and Nov. 23, 1922; Lee S. Chadwick and Marc Resek, Serial No. 596,970, filed Oct. 26, 1922; and Marc Resek, and Charles J. Kessler, Serial No. 598,932, filed Nov. 3, 1922. For specific details of the burner reference may be had to said applications, but for the present purpose it will suffice to say that the burner comprises inner and outer wick tubes 26 and 27, respectively, which are joined at their lower ends by an annular wall 28 thereby to enclose a wick space 29 which receives a supply of oil through the previously mentioned elbow fitting 21 from the pipe 14. A cylindrical wick 30, fitted with the usual carrier 31, occupies the wick space and, at its lower end, has connection with a wick elevator 32. The wick elevator is connected through a rod 33, with the upper end of a rack member 34. The rack member 34 is of channel formation and the lower portion of one of its side flanges is provided with a series of slots effecting a rack 35. Disposed in operative relation to the top tooth of the rack is a spring tongue 36 that is connected at 37 to the rack member. The purpose of this spring tongue will presently appear.

Journaled within the front and rear branches 22 and 38, respectively, of the previously mentioned bracket 23 is a spindle 40. A pinion 41 is secured to the spindle for cooperation with the teeth of the rack 35 thereby to reciprocate the rack when the spindle is rotated by means of a hand wheel 42 that is applied to its forward end, and to raise and lower the wick 30 through the intervention of the rod 33 and the wick elevator 32.

Wick stop mechanism, shown in detail in certain of the aforementioned applications is incorporated in the burner, and briefly the same comprises a ratchet wheel 45 which is mounted upon the rear end of and turns with the spindle 40. A pawl 46, that is carried by a stop plate 47 pivotally connected at 48 to a frame 49, is adapted to be raised into the path of the teeth of the ratchet wheel 45 when the frame, and consequently the stop plate 47, are lifted. This occurs when the wick is elevated sufficiently to engage and lift, through a flange 50, the flange spreader 51 whereof said flange is a part. The flame spreader has connection through latch elements 52 with the frame 49, said elements being pivoted at 53 to said frame. The flame spreader latch is disclosed in the application of Lee S. Chadwick and Marc Resek, Serial No. 528,833, filed Jan. 12, 1922.

When the spindle 40 is rotated by the hand wheel 42 in a direction to elevate the wick, the wick engages the flange 50 and lifts the flame spreader, together with the frame 49 and the stop plate 47 until the pawl 46 is caught by one of the teeth of the ratchet wheel 45. Thereupon the foregoing order becomes reversed and the flame spreader is lifted by the spindle through the intervention of the ratchet wheel 45, stop plate 47 and frame 49 faster than the wick is elevated, due to the difference between the radii of the pinion 41 and ratchet wheel 45 so as to elevate the flame spreader to operative position wherein it is suitably spaced above the tops of the wick tubes, its upward movement ceasing when the pivotal connection 48 between the stop plate 47 and frame 49 coincides with the axis of the spindle 40 (as will be seen by reference to the aforesaid applications of Lee S. Chadwick, Serial Nos. 528,813 and 602,740.) It may be explained here, however, that the stop plate is confined to a substantially vertical course through the initial portion of its upward movement by the engagement of a portion 56 thereof, below the pawl 46, with a roller 57 that is carried by the branch 38 of bracket 23. The lower arcuate edge of the stop plate escapes over the roller 57 and rides thereon at substantially the instant the pivot 48 of the stop plate reaches the plane of the axis of spindle 40, the roller serving as a support for the stop plate and, consequently, the parts that move vertically with it, including the flame spreader 51.

Suitably supported above the burner with its upper end in operative relation to the circulating element 4 is the burner drum 60.

Turning now to the present preferred form of the invention, and considering it incorporated in water heaters of the types shown complete in Figs. 1 and 11, it may be explained that the purpose here is to provide thermostatic means which will act, when the temperature of the water within the system rises to a pre-determined or an excessively high degree or when the burner parts become overheated to automatically turn down the wick. It is essential, however, that when the mechanism is set so as to be operated by the thermostat under either or both of the foregoing conditions, it should not interfere in any way with the manual adjustment of the wick. In other words, it is a purpose of the invention to provide means for automatically lowering the wick when the temperature of either the water in the system, or of the burner parts, or both, become excessively or dangerously high and yet which will allow the burner to be manipulated in the usual manner for raising and lowering the wick, and even to the extent of removing and replacing the wick, as though there were no such automatic mechanism associated with the burner.

As previously mentioned the invention may be divided into three general divisions, to wit: spring mechanism; a latch for retaining the spring mechanism in "set" position; and thermostatically controlled means for releasing the latch.

With reference particularly to Figs. 3 and 7, attention is called to cone collars 60 and 61 which are secured in spaced relation to each other upon the spindle 40 forwardly of the front branch 22 of the previously mentioned bracket 23. The enlarged ends of the collars terminate in flanged annular portions, and engaged against said portion of the collar 60 is a ratchet wheel 62 that is secured to the spindle 40 in any suitable manner and, incidentally, to the collar 60 as by means of solder or the like. Engaged against the face of the ratchet wheel 62, opposite the collar 60, and against the enlarged end of the cone collar 61, are bearing washers 64 and 65, respectively. The major parts of the spring mechanism are disposed between these bearing washers and, as will presently appear, are capable of both a rotating and oscillating action with respect to the spindle 40. The parts of the spring mechanism referred to consist of a resetting element or lever 66 which includes a finger grip 67; a stop flange 68; what is, in effect, a pawl 69 constituted of the end of the flange 68 adjacent the ratchet wheel 62 and arranged for cooperation with the teeth thereof; a pivot lug 70; and a latch engaging lug 71. The portion of the lever 66 which surrounds the spindle 40 is embossed to provide an annular portion 73 which is secured to the circular wall of a spring drum 74 as by rivets 75. The engaging portions of the lever and drum are provided with slots designated 76 through which the spindle 40 extends. This allows for the rotating and oscillating action of the lever and drum with respect to the spindle previously referred to. The open end of the drum 74 is flanged outwardly to provide a suitable bearing surface for engagement with the bearing washer 65.

Connected to the cross member 25 of the stand 1, by means of a screw 80 and lugs 81, is a mounting 82, preferably formed of a sheet metal stamping, that includes a depending support 83, a stop 84, and an abutment 85, the latter being arranged to be engaged by the pivot lug 70 of the lever 66 (see Figs. 8, 9 and 10).

Pivoted, as by mean of a bolt 87 or the like, to the support 83, are a latch trigger 88 and a bell crank lever 89. The latch trigger 88 incorporates a nose 90 that is arranged for cooperation with the latch engaging lug 71 of the lever 66; a flange 91 which extends along the upper edge of the trigger throughout the greater portion of its length and is adapted to rest on a shelf 92 of the mounting 82 when the trigger is in normal position; and a bottom flange which is depressed at one point to constitute a rocker arm engaging portion 93. A relatively powerful spring 95 connects the lower end 96 of the latch trigger with the shorter branch of the bell crank 89 and the longer branch of said crank is connected, through a link 97 and a chain 98, with the chain drum 74. For convenience in connecting and disconnecting the parts, the lower end 96 of the latch trigger is notched at 99 to receive one of the hooked ends of the spring 95, the other hook end of the spring being adapted to be engaged through an aperture in the bell crank prior to the connection of the former end of the spring with the latch trigger. Also the drum 74 is provided with a key-hole slot 100 through which the terminal link of the chain 98 may be readily engaged thereby to interlock the chain with the drum, while the opposite hooked ends of the link 97 may be engaged respectively with the link at the free end of the chain 98 and within an aperture of the bell crank.

Supported in a substantially horizontal position in the lower portion of the stand 1 is a platform 110 the forward end of which is secured to the cross member 25 while its opposite end is fastened to a rear panel 111 of the stand. Between laterally spaced depending lugs 112 of the platform 110 is disposed a rocker arm 114 which has side flanges 115 provided with apertures registering with apertures in the lugs 112, and a pintle 116 is extended through the registering apertures of the lugs and flanges thereby to pivotally connect the rocker arm to the platform. The forward end of the rocker arm extends beneath the latch trigger and is arranged to engage the portion 93 thereof, the extreme end of the rocker arm being turned upwardly as indicated at 118. The rocker arm incorporates at its rear end abutment portions 119 and 120.

Where the platform 110 extends beneath the burner 20 it is formed with an upwardly extending lug 121 which has riveted or otherwise secured to it a substantially S-shaped bracket 122 having three substantially parallel parts 124, 125 and 126. A thermostat 128 is supported inside the burner by the part 124 of the bracket 122, and it has a stem 129. While the thermostat 128 may be of any suitable type and construction, the one herein illustrated is of a well known form and consists of a metal bellows containing a fluid that is susceptible to temperature changes so that when the parts become heated the fluid will expand and distend the bellows thereby to depress its stem 129. The lower end of the stem is arranged to engage the abutment 120 of the rocker arm.

As will be seen by reference to Fig. 2, a similar thermostat 135 is housed within a compartment 136 of the water circulating unit 4. The thermostat is secured at its upper end to the top wall of the compartment 136 and its stem 137 extends downwardly through a guiding aperture in a branch 138 of the platform 110 that is immediately above the abutment portion 119 of the rocker arm, the latter being engaged by the lower end of said stem. A plug 140 closes the lower end of the compartment 136 and has an aperture through which the stem 137 is guided.

In describing the operation of the mechanism we will assume in starting that the spring mechanism is released, as shown in Fig. 10. To set the mechanism it is only necessary for the operator to take hold of the finger grip 67 of the lever 66 and swing it to the left (as the parts are viewed in Figs. 8, 9 and 10, or to the right as viewed in the other figures).

In so swinging the lever, the lug 70 thereof is brought into engagement with the abutment 85, whereupon the lever ceases to rotate about the spindle and rocks upon the fulcrum provided by said lug thereby to lift the pawl 69 out of engagement with the ratchet wheel 62. The lever is held in this position by the interlocking of the latch engaging lug 71 with the nose 90 of the latch trigger, as shown in Fig. 8. During the rotation of the lever 66, and consequently of the chain drum 74, the chain is wound about said drum which, through the link 97, causing the bell crank 89 to be drawn upwardly thereby to increase the tension of the spring 95. While the spring is tending to return the bell crank to its former position it is, at the same time, serving to rock the latch trigger in a direction to retain its nose 90 in engagement with the lug 71. Therefore the parts will be held in "set" condition until the latch trigger is actuated. This occurs when either or both of the thermostats 128 and 135 are elongated through a sufficient rise of the temperature affecting them, because when so elongated they depress through their stems the rear end of the rocker arm 114 thereby to rock the latch trigger in opposition to the action of the spring 95. Just as soon as the latch trigger is moved through an angle sufficient to withdraw its nose 90 from the latch engaging lug 71, the lever 66 will be released allowing it to rock upon the fulcrums provided by the lug 70 and abutment 85 so as to engage the pawl 69 with a tooth of the ratchet wheel 62 and, while being rotated through the previously described connections by the spring 95 about the axis of the spindle 40 it will, through the ratchet wheel 62, rotate the spindle to lower the wick. It is evident from the above description that when the mechanism is in "set" condition, with the pawl 69 withdrawn from the teeth of the ratchet wheel 62, the spindle 40 may be rotated freely in either direction by the hand wheel 42 thereby to adjust the wick as usual.

Attention is also called to the action of the bell crank 89 during the operation and resetting of the mechanism. It will be noted that the axis of the spring 95 approaches the pivot 87 and the axis of the link 97 recedes from said pivot as the bell crank is swung upwardly and as the tension of the spring 95 becomes greater, the leverage which the spring exerts upon the bell crank and, through the link, chain and drum, upon the lever 66 being thus lessened in proportion to the increased power of the spring. This effects a substantially uniform pull upon the chain drum 74 and consequently upon the lever 66, and furthermore the variation in the length of the spring is less than if the spring were directly connected to the drum. As a consequence of this, the resetting of the mechanism is easier than it otherwise would be and the shock incident to the stopping of the lever after it has been released is considerably lessened.

Mention has been made of the spring tongue 36 (see Figs. 4 and 5) which is secured to the rack member 34 with its lower end spaced from the topmost tooth of the rack 35. We shall now describe the purpose of this construction.

It will be remembered that when the spring mechanism is set, the wick may be adjusted vertically entirely independent of said mechanism by the hand wheel 42. Now let it be supposed that a full length or nearly full length wick is in the burner and that the same has been turned down somewhat and yet not sufficiently to lower the temperature enough, or quickly enough, to avoid actuation of one or both of the thermostats so that the spring mechanism is tripped and acts automatically to turn down the wick. The range of movement of the spring mechanism is sufficient to move the wick elevator 32 from its highest to its lowest position, and since the present wick, because of its length, requires the wick elevator to be raised only a limited extent in order to place the top of the wick within the burning range, the elevator will be brought to its lowest position before the lever 66 has been swung to its extreme left-hand position (as viewed from the front of the burner). To permit the lever to swing through its full length of movement until the flange 68 engages the stop 84, we provide the spring tongue 37 which is brought down along side the pinion 41 at the time the wick elevator is fully depressed so that the pinion may simply idle during the remainder of the throw of lever 66. Just as soon, however, as the spindle is rotated in a direction to elevate the wick, a tooth of the pinion engages the end of the spring tongue 36 and lifts the rack member so as to bring the teeth of the rack into cooperation with those of the pinion.

As a further example of its adaptability, the invention is shown in Fig. 11 as incorporated in the water heater hereinbefore referred to as constituting the subject matter of the application of Chadwick and Resek, entitled "Water heater and storage apparatus."

Briefly, the apparatus consists of a storage tank 150 that is supported a suitable distance from the floor by a stand 151 and is enclosed by a jacket 152. The tank has a central flue 153 within which a circulating coil 154 is arranged, which, as will be seen by reference to the aforesaid application, communicates with the storage compartment of the tank at top and bottom. The remaining parts of the outfit are designated by the same reference characters as are used to indicate the corresponding parts in the apparatus already described and shown in Figs. 1 and 2.

The modifications of the invention illustrated in Figs. 12 to 41, inclusive, are shown associated with substantially the same burner as that above described, and therefore like reference numerals are used to designate the corresponding parts of the burners throughout all views.

In Fig. 12, a spring 160 is shown as coiled about the pivot member 48 which connects the stop plate 47 with the frame 49, the spring having one of its ends secured at 161 to said stop plate and its other end bearing at 162 upon a part of the frame. The spring acts to rotate the stop plate in a direction to lower the wick, the stop plate having connection with the wick raising spindle through its pawl 46 and the ratchet wheel 45 it being recalled that the ratchet wheel 45 is attached to the spindle so that the two rotate together.

A latch lever 164 is pivoted at 165 to a bracket 166 that is shown as secured to the burner 20. The end of the latch lever which projects beneath the burner is provided with a notch 168 that is arranged to receive an abutment 169, carried by the stop plate 47. When the spindle is rotated to elevate the wick to "high" position, the abutment 169 is brought to a position to be received by the notch 168, and with the abutment resting within said notch, lever 164 serves to hold the parts in position to maintain the wick elevated.

The end of the lever 164 remote from the burner is connected, through a link 170, with the free end of one branch of a bell crank that is pivoted at 172 to a suitable support 173 which may be a part of the stand or other supporting structure (not shown). A water containing unit is represented generally at 175 as disposed in operative relation to the burner 60, and a thermostat casing 176 is shown, particularly in Fig. 13, as screwed through a boss in the side of said unit. A metallic bellows 177 occupies the outer end of the casing 176 and its interior communicates with the interior of the casing 176 where the latter extends inwardly and into the unit 175. A lever 178 is pivoted at 179 to the thermostat casing and where it extends across the open outer end of the casing has connection, through a part 180, with the bellows 177. The lower end of the lever 178 is articulated at 181 to the upper end of the other branch of the previously mentioned bell crank 171. A spring 182 has one of its ends connected to the lever 178 and its other end connected to an arm 183 which extends inwardly and downwardly from the enlarged end of the casing 176. A guide 185 is rigidly secured to and extends outwardly from the arm 183 and its outer end is formed into a hook which embraces the lever 178.

The link 170 which connects the latch lever 164 to the bell crank 171 is shown in detail in Fig. 14 and the same comprises a loop which has its ends disposed on opposite sides of the branch of the bell crank to which it is connected by a rivet 186 or its equivalent. A pin 187 passes through slots 188 in the opposite sides of the loop and through registering holes in the lever 164 and in a clip 165 that is applied to the lever and has one of its ends disposed between said lever and the adjacent branch of the bell crank 171 to provide ample bearing surfaces for said parts. The opposite end of the clip is notched at 190 to receive a plunger 191 which has one of its ends engaged through a hole in the top of the loop and its other end provided with a head 192 that is engaged beneath the upper notched end of the clip 165. A spring 193 surrounds the plunger and is compressed between the clip and the upper end of the loop. This arrangement provides a yielding connection between the lever 164 and the bell crank 171 which permits the lever to move independently of the bell crank in one direction thereby enabling the mechanism to be set without such action being resisted by the thermostat.

Assuming that the parts are in "set" condition, as illustrated in Fig. 12, when the thermostat, comprised of the casing 176 and the bellows 177, is elongated by an expansion of the fluid contained therein, the lever 178 will be swung outwardly at its lower end against the tension of spring 172 and will rock the bell crank 171 to release the abutment 168 and allow the spring 160 to swing the stop plate 47 in a direction to lower the wick, the action of the spring carrying the stop plate far enough to remove it from the support 57ª (which is an equivalent of the roller 57 of the previously described form.) From this point on the frame 49 and parts carried thereby drop of their own weight as do also the wick and the wick raising parts.

In the form of the invention illustrated in Figs. 15 to 17, a gear 200 is secured to the spindle 40 inside the hand wheel 42 in a position to be engaged by a rack 201 that is supported for reciprocation within a guide 202 that is formed at the upper end of a plate 203, secured to the front branch 22 of the bracket 23. The rack 201, in the present instance, is produced by forming a series of properly spaced comparatively narrow slots in the web of a channel member, and adjacent the right-hand end of the rack there is an elongated slot 205. A tension spring 206 surrounds the rack and has one of its ends connected to the plate 203 and its opposite end to the rack, said spring tending to move the rack to the left as the parts are viewed at 15, 15ª and 17.

A latch lever 210 is pivoted at 211 to the plate 203 and it has a lug 212 that is adapted to be engaged by a projection 213 of the rack when the latter is in its extreme right hand position. When in such position, the gear 200 is adapted to play freely within the slot 205. Consequently, when the mechanism is in "set" condition, the wick may be adjusted by means of the hand wheel 42 without interference.

The free end of the latch lever 210 is connected through a link 214 with the horizontal branch of a bell crank lever 215 that is pivoted at 216 to a suitable support 217. The link 214 is identical with the link 170 of the immediately preceding embodiment. The other end of the bell crank lever 215 is pivoted at 218 to the lever 219 of a thermostat 220, this being the same as the thermostat of the preceding modification except that the thermostat acts upon the lever 219 above instead of below the fulcrum 221.

In this case when the thermostat elongates it will rock the lower end of the lever 219 inwardly and depress the free end of the horizontal branch of the bell crank 215 to withdraw the lug 212 from the projection 213 freeing the rack 201 and allowing it to be drawn to the left by the spring 206 thereby to rotate the gear 200 and through it the spindle 40 in a direction to lower the wick. It will be observed that the teeth of the gear 200 are so formed that it is impossible for the end tooth of the rack to engage the end of a tooth of the gear. If the gear is in such position that one of its teeth is just within the path of the rack, engagement of the rack and the side of the tooth is assured; and, on the other hand, should said tooth be just below the plane of the rack the end tooth of the rack will pass over said tooth of the gear and squarely engage the side of the next tooth. This avoids any possibility of the rack and gear locking. The rack is provided with a ring 225 which may be grasped by the finger for setting the mechanism, the latch lever being permitted to rock on its pivot independently of the bell crank 215 while the projection 213 is riding over the lug 212 by reason of the yielding connection provided by the link 214.

The modification of the invention illustrated in Figs. 18 to 23 is, in some respects, similar to the modification illustrated in Figs. 12 to 14, the same thermostatic control applying in both cases.

In the present modification a latch lever 230 is pivoted at 231 to a bracket 232 which is secured to and depends from the burner 20. The inner end of the latch lever 230 is shown as having two notches 234 and 235. In Fig. 19, the lever is shown in a position to engage the notch 234 with an abutment 236 on the stop plate 47. By providing two notches in the latch lever, a graduated turning down of the wick is effected because, upon the initial operation of the thermostat the abutment 236 will be dislodged from the notch 234 and engage within the notch 235 where it will remain until the thermostat further expands to swing the lever far enough to remove it entirely from contact with the abutment 236.

In the present form of the invention, the spring for turning down the wick is housed within the hand wheel as we shall now point out in detail. Fixed to the bracket 23 is a shell 240 having an outer enlarged cylindrical end within which a spring 241 is housed, the inner end of the spring bearing upon a shoulder 242 of the shell while the opposite end is contained within the annular depressed portion of a washer 243. A cup shaped hand wheel 245 is secured to the outer end of the spindle 40, and a ring 246 loosely surrounds its peripheral flange 247. The ring has driving connection with the hand wheel through pins 248 that extend radially from flange 247 through slot 249 in said ring. The nature of this connection allows the ring to be moved axially but not circumferentially of the hand wheel. The inner edge of the ring is opposed to the edge portion of the circular wall 250 of a drum 251 which extends inside the hand wheel 245. A hollow boss 252 is formed at the center of the circular wall 250 and its inner end is provided with a flange having notches 253 within any one of which a tooth 254, that is carried by the shell 240, may engage. The previously mentioned washer 243 bears against the boss 252 so that the spring 241 tends to force the drum outwardly thereby to maintain it locked to the shell 240 against turning through said tooth 254. Mounted for limited rotation upon the spindle 40 inside the hand wheel is a ratchet member 255. The hub of said member has a screw thread connection with the boss 252 through a left hand thread 256. The front face of the ratchet member 255 has ratchet teeth 257 which are arranged for cooperation with a tooth 258 that is carried by the circular wall of the hand wheel 245. A spiral spring 260 has its outer end connected to the drum 251 and its inner end connected to the ratchet member 255. The ratchet member and drum are provided, respectively, with stops 261 and 262.

Figs. 18, 19 and 20 show the mechanism in "set" condition with the abutment 236 of stop plate 47 engaged within the notch 234 of the latch lever 230, it being assumed that the wick is in "high" position with the parts so arranged. In this condition, the spring 260 is wound as much as it is possible to wind it by reason of the nature of the construction. The parts remain in the present condition until the thermostat has been elongated sufficiently to swing the lever 230 enough to dislodge the abutment 236 from the notch 234. As soon as the abutment is liberated from said notch the spring 260, tending to unwind, rotates the hand wheel and consequently the spindle 40 in a counter-clockwise direction until the parts are arrested in their movement by the engagement of the abutment 236 within the notch 235 thus effecting only a partial turning down of the wick. The parts will now remain in this condition until the thermostat is further elongated (if the circumstances are such as will cause this action), and upon the thermostat becoming further elongated the lever 230 will be rocked to withdraw the notch 235 from the abutment 236 thus placing the spindle completely under the influence of the spring 260 whereupon the spring will rotate the ratchet member 255, and with it the hand wheel and spindle, further in a counter-clockwise direction, far enough to completely lower the wick and extinguish the flame. During the operation above described the ratchet member 255 is fed inwardly along the spindle by reason of its left-hand thread connection with the boss of the drum 251 until the stop 261 engages the stop 262 thus preventing further rotating in the present direction of the ratchet member with respect to the drum. Because of the fact that the ratchet member is limited in its rotary movement in one direction by its engagement with the hand wheel and in the opposite direction by the engagement of the stops 261 and 262, the spring 260 is at all times maintained under tension, this being for the purpose of constantly maintaining sufficient power within the spring to turn down the wick. To turn up the wick and reset the mechanism the hand wheel is rotated in a clock-wise direction. This results in the spring being rewound because the rotation of the hand wheel is transmitted to the ratchet member 255, to which the inner end of the spring is attached, through the tooth 258. The rotation of the ratchet member independently of the drum 251 causes the former to be fed forwardly by reason of its left-hand thread connection with the latter, thereby to withdraw the stop 261 from the plane of stop 262 and allow the ratchet member to be rotated through more than 360°. This is necessary in order to provide sufficient angular movement between the ratchet member 255 and drum 251 to insure the wick's being elevated to "high" position. The parts are held in "set" condition with the wick fully elevated by the engagement of the latch lever 230 with the abutment 236.

Now, when it is desired to remove the wick, as for the purpose of inserting a new one, the ring 246 is forced inwardly against the projecting edge portion of the circular wall 250 of the drum 251 and far enough to shift said drum, with the parts attached to it, in the same direction sufficiently to disengage its notched flange from the tooth 254, such movement being yieldingly resisted by the spring 241. With the drum thus disengaged from said tooth the spindle may be rotated freely to eject the wick from the burner. When inserting a new wick, the spindle may be rotated in a counter-clockwise direction to lower the wick, but during this operation it is not necessary to hold the ring 246 inwardly against the tension of the spring 241 to disengage the notched extension of the drum from the tooth 254 as now the tooth 258 of the hand wheel may ride freely over the teeth of the ratchet member 255, said member and the parts connected to it yielding inwardly to permit of such action.

In the modification illustrated in Figs. 24 to 27, a plate 270 is rotatably mounted on the spindle 40, and, secured to the spindle, alongside said plate is a drum 271. Pivoted at 272 to an extension 273 of the plate 270 is a brake member 274 which has a nose 275 that is eccentric with respect to the pivot 272 so that upon due angular movement of the brake member with respect to the plate 273 said nose will be forced into frictional engagement with the periphery of the drum 271. A coil spring 278 has one of its ends connected at 279 to the brake member 274 and its opposite end anchored at 280 to a portion of the stationary bracket 281 that is shown as secured to the front branch 22 of the bracket 23. Pivoted upon a pin 282 which extends through a slot 283 in the outer end of a lateral extension 284 of the bracket 281, is a latch plate 285 having an abutment 286 that is adapted to be engaged over the outer end of an arm 287 which projects from the brake member 274. A spring 290, which has one of its ends anchored at 291 to the bracket 281 and its opposite end fastened to the pivot member 282, tends to draw the pivot member inwardly and maintain the latch plate 285 in a position to engage its abutment 286 with the arm 287. The free end of the latch plate is connected, through a link 293, with the lower end of the thermostat lever 294 which is adapted to be rocked on its pivot 295 when the element of the thermostat 296 is expanded.

With the parts in "set" condition, as illustrated in Figs. 24 to 26, the wick may be adjusted at will through the manipulation of the hand wheel 42. However, as soon as the thermostat expands sufficiently to throw the latch plate out of holding engagement with the arm 287 of the brake member the spring 278 will rotate said brake member, first, about the pivot 272 sufficiently to engage its nose 275 with the periphery of the drum 271 (as shown in full lines in Fig. 27) and, second, through its full range of movement to the position indicated in dotted lines in Fig. 27 thereby to rotate the spindle 40 in a direction, and far enough to retract the wick and extinguish the flame. The mechanism may be reset at any time after the thermostatically controlled parts resume normal condition by swinging the arm 287 over and bring its end into engagement with the abutment 286, the latch plate, during such action, swinging outwardly at its lower end in opposition to the spring 290 to permit the end of the arm to pass beneath the abutment 286.

In connection with the modification illustrated in Figs. 28 to 32 may be utilized the thermostatic arrangement shown in Fig. 24ª and employed with the form of the invention just above described. In the present modification the mechanism takes the form of a self-containing unit that is applied to the burner and which included a spindle 40ª equipped at its outer end with a hand wheel 42ª and at its inner end with a coupling member 42ᵇ that is designed to receive the hand wheel 42 of the burner spindle 40. The coupling member has projections 42ᶜ that extend through apertures in the hand wheel 42. The coupling member 42ᵇ, and a ratchet wheel 300, are secured to the inner end of the spindle 40ª through a suitable fitting 301. A sleeve 303 has one of its ends mounted upon the fitting 301 and engaged within an aperture in the rear branch 304 of a U-shaped housing 305 the forward branch whereof is designated 306. Said housing is mounted upon a horizontal portion of a bracket 308 that is shown as secured, together with the branch 22 of the bracket 23, to the structural member 309 which may be the same as the cross member 25 of the earlier described stands 1 and 151. The forward end of the sleeve 303 is pivoted upon a thimble 312 which is engaged within an aperture in the branch 306 of the housing 305. A shell 313 is shown as mounted upon the thimble 312 between the opposed portions of the branch 306 and the sleeve 303. Journaled upon the sleeve 303 alongside the branch 304 of the housing 305 is a plate 315 which has pivoted to it, at 316, a drum 317. This drum has in its circular wall 318 an enlarged opening 319 through which the sleeve 303 extends which is enough greater in diameter than said sleeve to permit the drum to move laterally of the sleeve upon the pivot 316. A spring 325 is coiled about the sleeve 303 and has one of its ends secured at 326 to the drum 317 and its other end extended through an aperture 327 in the shell 313 and anchored at 328 to the branch 306 of the housing. An annular plate 330 fits within the open end of the drum 317 against a shoulder 331 thereof and is engaged by the open end of the shell 313.

A handle 333 is secured to and extends from the periphery of the drum 317, and a latch engaging lug 334 extends inwardly from the circular wall 318 of said drum. The plate 315 is provided with a rearwardly extending lug 335 which is arranged to engage one of the edges of the rear branch 304 of the housing 305. The branch 304 has a lateral extension 337 to which is pivoted at 338 the inner end of a latch plate 339 that has connection through a link 340 with a thermostat lever which may be identical with the one 204 which is shown in Fig. 24ª. When the mechanism is set, the lug 334 is engaged beneath an abutment 341 of the latch plate 339, the spring 325 being under full tension. It may be explained before describing the operation of the present modification that the inner end of the latch engaging lug 334 constitutes a pawl for cooperation with the teeth of the ratchet wheel 300; and it will be observed that when the mechanism is in "set" condition said lug is out of the path of the teeth of said ratchet wheel so that the spindles 40ª and 40 may be manually rotated in either direction, by the hand wheel 42ª, thereby to adjust the wick. As soon as the thermostat acts to shift the latch plate outwardly and liberate the lug 334, the drum 317 will, under the action of the spring 325, swing on its pivot 316 to engage the lug 334 with a tooth of the ratchet wheel 300, and upon the drum being thus operatively connected to the spindle, the spring 325 will further act to rotate the drum and said spindle in a direction to lower the wick. The position of the parts immediately after the lug 334 has been released is illustrated in Fig. 30, while the final position of the parts is illustrated in Fig. 31 with the lug 334 engaged with a part of the branch 304 of the housing.

The modification of the invention illustrated in Figs. 33 to 39 is similar in many respects to the first described form and is shown associated with the same parts as the earlier modification including the thermostatic trip mechanism. Therefore, the same reference numerals are applied to the corresponding parts of the two embodiments.

Turning now to the parts which distinguish the present modification from the form first described, 350 is a reset lever which is journaled upon the spindle 40 and has a latch engaging portion 351 and a spring attaching portion 352. A collar 355 is mounted on the spindle 40 just inside the reset lever 350 and serves to properly support the lever in the region of the spindle, and loosely surrounding the spindle on the other side of the lever 350 is a plate 356. The lever and plate are pivotally connected together at 357, and a spring 358 tends to rock the lever and plate with respect to each other on the pivot 357 for a purpose which shall presently appear. Pivoted at 360 to an arm 361 which extends forwardly and downwardly from the structural element or cross member 25 is a latch trigger 363. One end of the latch trigger overlies the forward end of the rocker arm 114, and its opposite end terminates in an ear 364 to which one end of a spring 365 is secured, the opposite end of said spring being connected to the spring attaching portion 352 of the reset lever. The latch trigger is provided with a nose 367 and with an abutment 368. The previously mentioned plate 356 has a stop 369 which is arranged to engage the abutment 368, and it incorporates a pawl 370 for cooperation with the teeth of a ratchet wheel 371 that is secured to the spindle 40 immediately inside the hub portion of a hand wheel 42 that is fastened to the outer end of the spindle and by means of which the spindle may be rotated to raise and lower the wick.

When the mechanism is in "set" condition, as illustrated in Figs. 33 to 36, the reset lever 350 is in a vertical position with its latch engaging portion 351 engaged beneath the nose 367 of the latch trigger 363, and the stop 369 of the plate 356 is in engagement with the abutment 368 of the latch trigger thereby to maintain said plate in a position wherein the pawl 370 is out of the path of the teeth of the ratchet wheel 371. With the parts in this condition, therefore, the spindle may be rotated without interference. When either or both of the thermostats, through their respective stems 129 and 137, depresses the rear end of the rocker arm 114, it will cause the front end of said rocker arm to lift and rock the latch trigger upon its pivot 360 causing its nose 367 and its abutment 368 to be withdrawn from the latch engaging portion 351 and the stop 369, respectively, permitting the spring 358 to swing the plate 356 upon its pivot 357 and project its pawl 370 into cooperation with one of the teeth of the ratchet wheel 371 so that when the spring 365 rotates the reset lever 350 in a counter-clockwise direction said lever will carry the plate and consequently the ratchet wheel in a corresponding direction thereby to rotate the spindle so as to lower the wick and extinguish the flame. The mechanism is shown in full lines in Fig. 37 as though the latch trigger has just been retracted and the pawl 370 thrown into engagement with the ratchet wheel, and in dotted lines in the positions to which said parts are impelled by the spring 365.

The burner construction is slightly modified to adapt it to the form of the invention illustrated in Figs. 40 and 41. The outer wick tube 27 is shown as constructed of two parts, the lower part having formed integral with it a casing 380 which houses a thermostat 381, the thermostat having, at its inner end, a stud 382 that is secured within a boss 383 of the wick tube. The stem 384 of the thermostat extends through a hole in a plug 385 which closes the outer end of the casing 380, and while the stem may reciprocate freely through the hole in the plug it is held against turning with respect to the plug as by a key 386. A head 388 is pinned or otherwise secured to the outer end of the stem 384 and the same contains a vertical bore 389 that is reduced in diameter at its upper end and contains a plunger 390 which projects through the reduced end of the bore and has a head 391 which is engaged within the enlarged portion of the bore, the plunger being held against turning by a pin 392 which projects from one side of its head through a slot 393 that is formed in the head 388.

Secured to the spindle 40 a suitable distance inwardly from the hand wheel 42 is a disk 395 which has an annulus 396 of suitable friction material riveted or otherwise secured to it. Journaled upon the spindle 40, inwardly of the disk 395 is a pressure plate 397 which has a flat peripheral portion bearing against the annulus 396. A sleeve 398 surrounds the spindle and has its outer end secured, as by rivets 399, to the pressure plate 397, while its inner end bears against the outer branch 400 of the bracket 401 which, with the front branch 22 of the bracket 23, is secured, as by a bolt 402, to the structural element or cross member 25. A spring 404 surrounds the sleeve 398 and has its inner end secured at 405 to the branch 400, while its opposite end is hooked through an aperture in the pressure plate 397, as shown at 406. The spring 404 has the double function of rotating the pressure plate 397 in a counter-clockwise direction, and of pressing said plate firmly against the annulus 396. An arm 410 extends from the pressure plate and at its outer end is directed rearwardly toward the burner where it is equipped with a pin 411 that is designed for cooperation with the plunger 390. The cooperating ends of the plunger and pin are formed with straight portions for locking engagement with each other and with beveled portions which are adapted to override each other during the resetting operation of the mechanism, the plunger yielding inwardly to permit the pin to pass it, much in the nature of an ordinary latch. A handle 412 is applied to the arm 410 to facilitate the resetting of the parts. With the parts held in the position shown and against the tension of the spring 404, the wick may be raised or lowered by the manipulation of the hand wheel 42, it being necessary to apply sufficient power thereto to overcome the friction between the pressure plate and the annulus 396 of the disk 395. When, due to an excessive rise in temperature of the burner parts, the thermostat 381 is elongated sufficiently to remove the plunger 390 from the pin 411, the spring 404 rotates the pressure plate in a counter-clockwise direction, and due to the pressure of said plate upon the parts that are carried by the spindle 40, said spindle will be rotated in the same direction to retract the wick and extinguish the flame.

A marked advantage possessed by the majority of the embodiments of our invention herein disclosed, as is readily apparent from the foregoing description, is that after the wick has been lowered by the thermostatically controlled mechanism through a rise of temperature to an excessively high degree, the wick cannot be reset in high position until the temperature drops. The mechanism is so designed and constructed that, after it has operated, the wick can not be turned up and maintained in elevated position until said mechanism is reset, so that in case the thermostat does operate again it will result in the lowering of the wick.

Consider, for example, the form of the invention illustrated in Figs. 1 to 11. As soon as the resetting lever 66 is released, its pawl 69 is thrown into engagement with the ratchet wheel 62 where it is firmly maintained by the action of the spring 95 throughout its advance movement (for which said spring is responsible) and throughout its manual retraction until it is withdrawn from the ratchet wheel by the rocking of the lever on the fulcrum provided by the engagement of the pivot lug 70 with the abutment 85. Any attempt to elevate the wick prior to a resetting of the lever 66 would be defeated by the spring 95, and said lever can not be reset until the thermostat permits of a return of the latch trigger 88 to its holding position wherein its nose 90 cooperates with the lug 71 of the lever 66.

Thus the possibility is obviated of a person turning up the wick immediately after the thermostatic mechanism has operated and thereby further increasing the temperature to a hazardous degree.

Having thus described our invention, what we claim is:—

1. In combination with a liquid fuel burner of the wick type, means for raising the wick, means tending to lower the wick, latch mechanism for retaining the latter means in ineffective condition, and thermostatic means for releasing the latch.

2. In combination with a liquid fuel burner of the wick type, wick adjusting means involving a spindle that is rotatable in one direction to raise the wick and in the opposite direction to lower the wick, a spring, a friction clutch through which said spring has driving connection with the spindle, the spring tending to rotate the spindle in a direction to lower the wick, latch mechanism for maintaining the spring under tension, and a thermostat for releasing said latch.

3. In combination with a liquid fuel burner of the wick type, wick adjusting means involving a spindle that is rotatable in one direction to raise the wick and in the opposite direction to lower the wick, a member rotatable with the spindle, a friction plate rotatably supported upon the axis of the member, means pressing said friction plate against said member and tending to rotate said plate, and through it and said member the spindle, in a direction to lower the wick, a thermostat, and separable connections between the thermostat and said pressure plate for normally retaining said pressure plate in a position to maintain the wick elevated, said connections being rendered ineffective through the action of the thermostat.

4. In combination with a liquid fuel burner of the wick type, wick adjusting means involving a spindle that is rotatable in one direction to raise the wick and in the opposite direction to lower the wick, a member secured to the spindle, a friction plate rotatably supported upon the axis of the spindle adjacent said member, means pressing said friction plate against said member and tending to rotate said plate and, through it and said member, the spindle in a direction to lower the wick, a thermostat, and separable connections between the thermostat and said pressure plate for normally retaining said pressure plate in a position to maintain the wick elevated, said connections being rendered ineffective through the action of the thermostat.

5. In combination with a liquid fuel burner of the wick type, wick adjusting means involving a spindle that is rotatable in one direction to raise the wick and in the opposite direction to lower the wick, a member rotatable with the spindle, a friction plate supported upon the rotating axis of said member, a spring pressing said friction plate against said member and tending to rotate the plate and, through it and said member, the spindle in a direction to lower the wick, a movable abutment, the friction plate having a part arranged to engage said abutment thereby to hold the aforesaid spring under tension, and a thermostat having operative connection with said movable abutment thereby to move the abutment out of engagement with the aforesaid part of the friction plate when the thermostat is actuated by a change in temperature.

6. In combination with a liquid fuel burner of the wick type, wick adjusting means involving a spindle that is rotatable in one direction to raise the wick and in the opposite direction to lower the wick, means tending to rotate the spindle in the latter direction, a spring actuated latch for retaining said means in ineffective condition, and thermostatic means for releasing the latch.

7. In combination with a liquid fuel burner of the wick type, wick adjusting means involving a spindle that is rotatable in one direction to raise the wick and in the opposite direction to lower the wick, means tending to rotate the spindle in the latter direction, a latch for retaining said means in ineffective condition, a common spring for energizing said means and for maintaining the latch in effective position, and thermostatic means for releasing the latch.

8. In combination with a liquid fuel burner of the wick type, wick adjusting means involving a spindle that is rotatable in one direction to raise the wick and in the opposite direction to lower the wick, means tending to rotate the spindle in the latter direction, further means for holding the spindle against such rotation, and thermostatic means for rendering the last mentioned means ineffective.

9. In combination with a liquid fuel burner of the wick type, wick adjusting means involving a spindle that is rotatable in one direction to raise the wick and in the opposite direction to lower the wick, a member rotatable with the spindle, brake means for grasping said member, means tending to rotate the brake means in a direction to rotate said member and through it the spindle in a direction to lower the wick, a latch for retaining the brake means in ineffective condition and the aforesaid spring under tension, and a thermostat for releasing the latch.

10. In combination with a liquid fuel burner of the wick type, wick adjusting means involving a spindle that is rotatable in one direction to raise the wick and in the opposite direction to lower the wick, a member secured to and rotatable with the spindle, a plate rotatable upon the spindle, a brake element pivoted to said plate and having a part engageable with said member when the brake element is rocked upon its pivot, a spring tending to rock said brake element upon its pivot and to rotate said brake element and, through it, the plate and said member, the spindle in a direction to lower the wick, a latch for retaining the brake element in ineffective condition, and a thermostat for releasing the latch.

11. In combination with a liquid fuel burner of the wick type, wick adjusting means involving a spindle that is rotatable in one direction to raise the wick and in the opposite direction to lower the wick, a ratchet wheel rotatable with the spindle, a pawl carrying member rotatable upon the axis of said ratchet wheel and capable of shifting laterally with respect thereto, a pawl carried by said member for cooperation with the ratchet wheel, a spring tending to move the pawl carrying member laterally with respect to the axis of the ratchet wheel thereby to engage the pawl with a tooth of said wheel, the spring further tending to rotate said member and, through it and the ratchet wheel, the spindle in a direction to lower the wick, a latch for retaining said member in a position with the pawl out of engagement with the teeth of the ratchet wheel and with said spring under tension, and a thermostat for releasing the latch.

12. In combination with a liquid fuel burner of the wick type, wick adjusting means involving a spindle that is rotatable in one direction to raise the wick and in the opposite direction to lower the wick, a ratchet wheel rotatable with the spindle, an element rotatable upon the axis of the ratchet wheel, a pawl carrying member pivoted to said element and rotatable upon the axis of the ratchet wheel and shiftable laterally with respect thereto, a pawl carried by said member for cooperation with the ratchet wheel, a spring tending to shift the pawl carrying member in a direction to engage the pawl with the ratchet wheel and to rotate said member and, through it and the pawl and ratchet wheel, the spindle in a direction to lower the wick, an abutment, the aforesaid element having a stop arranged to engage said abutment, a latch for retaining the pawl carrying member in a position with the pawl out of engagement with the ratchet wheel and the aforesaid element in a position with its stop in engagement with said abutment, and a thermostat for releasing the latch.

13. In combination with a liquid fuel burner of the wick type, wick adjusting means involving a spindle that is rotatable in one direction to raise the wick and in the opposite direction to lower the wick, a ratchet wheel rotatable with the spindle, an element rotatable upon the axis of the ratchet wheel, said element having a latch engaging portion, a pawl carrying member pivoted to said element and rotatable upon the axis of the ratchet wheel and shiftable laterally with respect thereto upon its pivot, a pawl carried by said member for cooperation with the teeth of the ratchet wheel, a spring for shifting the pawl carrying member with respect to the aforesaid element thereby to engage the pawl with a tooth of the ratchet wheel, said pawl carrying member incorporating a stop, a structural part fixed with respect to the burner, a latch trigger pivoted to said part and having a nose for holding engagement with the latch engaging portion of the aforesaid element and an abutment for engagement by the stop of the pawl carrying member when the latch trigger is in effective position, a spring connecting the latch trigger to the aforesaid element and tending to maintain the latch trigger in effective position and to rotate said element and, through it and the pawl carrying member and ratchet wheel, the spindle in a direction to lower the wick when said element and the pawl carrying member are released by the latch, and thermostatic means for releasing the latch.

14. In combination with a liquid fuel burner of the wick type, wick adjusting means involving a spindle that is rotatable in one direction to raise the wick and in the opposite direction to lower the wick, a ratchet wheel rotatable with the spindle, an element rotatable upon the axis of the ratchet wheel, a pawl carrying member pivoted to said element, a pawl carried by said member for cooperation with the teeth of the ratchet wheel, means tending to shift the pawl carrying member upon its pivot thereby to remove the pawl from the path of the ratchet teeth, a spring tending to rotate the element and, through it and the pawl carrying member and ratchet wheel, the spindle in a direction to lower the wick, and a latch cooperating with the element and pawl carrying member in such manner as to maintain the aforesaid spring under tension and the pawl carrying member in ineffective position, and thermostatic means for releasing the latch.

15. In combination with a liquid fuel burner of the wick type, wick adjusting means involving a spindle that is rotatable in one direction to raise the wick and in the opposite direction to lower the wick, a ratchet wheel rotatable with the spindle, an element rotatable upon the axis of the ratchet wheel and having a latch engaging portion, a pawl carrying member pivoted to said element eccentric with respect to the latter's rotating axis, said member having a latch engaging portion, a pawl carried by said member for engagement with the teeth of the ratchet wheel, means tending to shift said member upon its pivot thereby to project the pawl into engagement with a tooth of the ratchet wheel, a latch having parts for cooperation with the latch engaging portions of the element and pawl carrying member thereby to restrain the element from rotation and the pawl carrying member from movement in a direction to engage the pawl with the ratchet wheel, a spring tending to rotate the element and, through it and the pawl carrying member and ratchet wheel, the spindle in a direction to lower the wick, and thermostatic means for releasing the latch.

16. In combination with a liquid fuel burner of the wick type, wick adjusting means involving a spindle that is rotatable in one direction to raise the wick and in the opposite direction to lower the wick, a ratchet wheel rotatable with the spindle, a pawl carrying member rotatable upon the axis of the ratchet wheel and incorporating a pawl for cooperation with the teeth of the ratchet wheel, said member having a pivot part and a latch engaging portion, a structural part fixed with respect to the burner and having an abutment adapted to be engaged by the pivot part of the pawl carrying member, a latch trigger pivoted to said structural part and having a nose arranged for holding engagement with the latch engaging portion of said member, the member when so held being rocked upon its pivot part to maintain the pawl out of engagement with the teeth of the ratchet wheel, a spring tending to maintain the latch lever in effective position and having connection with the pawl carrying member and serving, when said member is released, to first rock the member upon its pivot part thereby to engage the pawl with a tooth of the ratchet wheel and thereafter to rotate the member upon the axis of the wheel and through it and said wheel, rotate the spindle in a direction to lower the wick, and thermostatic means for moving the latch trigger to ineffective position.

17. In combination with a liquid fuel burner of the wick type, wick adjusting means involving a spindle that is rotatable in one direction to raise the wick and in the opposite direction to lower the wick, a ratchet wheel rotatable with the spindle, a pawl carrying member rotatable upon and shiftable laterally with respect to the axis of the ratchet wheel, said member incorporating a pawl for cooperation with the teeth of said wheel and having a pivot part and a latch engaging portion, a structural part fixed with respect to the burner and having an abutment arranged to be engaged by the pivot part of the pawl carrying member, a latch trigger pivoted to said structural part and having a nose for holding engagement with the latch engaging portion of the pawl carrying member, the pawl carrying member being rocked upon its pivot part when held by the latch thereby to retain the pawl out of engagement with the teeth of the ratchet wheel, a spring tending to retain the latch trigger in effective position and having operative connection with the pawl carrying member thereby to shift said member when said member is released to project the pawl into engagement with a tooth of the ratchet wheel and to rotate said member, and through it and the ratchet wheel, the spindle in a direction to lower the wick, and thermostatic means for releasing the latch.

18. In combination with a liquid fuel burner of the wick type, wick adjusting means involving a spindle that is rotatable in one direction to raise the wick and in the opposite direction to lower the wick, a ratchet wheel rotatable with the spindle, a reset lever incorporating a drum and rotatable upon the axis of the ratchet wheel and shiftable laterally with respect thereto, the reset lever having a portion constituting a pawl for cooperation with the teeth of the ratchet wheel, said lever being provided also with a pivot lug and latch engaging portion, a structural element fixed with respect to the burner and having an abutment arranged to be engaged by the pivot lug of the reset lever, a latch trigger pivoted to the structural element and having at one end a nose for holding engagement with the latch engaging portion of the reset lever, said lever being rocked upon its pivot lug when said portion is engaged with the latch thereby to withdraw the pawl from the teeth of the ratchet wheel, a bell crank pivoted to the structural element upon the pivotal axis of the latch trigger and having branches of different lengths, a spring connecting the shorter branch of said bell crank with the opposite end of the latch trigger, flexible connections between the longer branch of the bell crank and the aforesaid drum whereby the action of the spring is transmitted to the reset lever through the bell crank, said flexible connections being engaged about the drum in a direction to rock the lever when released by the latch to effect engagement of its pawl with a tooth of the ratchet wheel and thereafter to rotate said lever and, through it, the spindle in a direction to lower the wick, and thermostatic means for actuating the latch trigger to release the reset lever.

19. In combination with a liquid fuel burner of the wick type, wick adjusting means involving a spindle that is rotatable in one direction to raise the wick and in the opposite direction to lower the wick, a ratchet wheel rotatable with the spindle, a reset lever incorporating a drum and rotatable upon the axis of the ratchet wheel and shiftable laterally with respect thereto, the reset lever having a portion constituting a pawl for cooperation with the teeth of the ratchet wheel, said lever being provided also with a pivot lug and a latch engaging portion, a structural element fixed with respect to the burner and having an abutment arranged to be engaged by the pivot lug of the reset lever, a latch trigger pivoted to the structural element and having at one end a nose for holding engagement with the latch engaging portion of the reset lever, said lever being rocked upon its pivot lug when said portion is engaged with the latch thereby to withdraw the pawl from the teeth of the ratchet wheel, a bell crank pivoted to the structural element upon the pivotal axis of the latch trigger and having branches of different lengths, a spring connecting the shorter branch of said bell crank with the opposite end of the latch trigger, flexible connections between the longer branch of the bell crank and the aforesaid drum whereby the action of the spring is transmitted to the reset lever through the bell crank, said flexible connections being engaged about the drum in a direction to rock the lever when released by the latch to effect engagement of its pawl with a tooth of the ratchet wheel and thereafter to rotate said lever and, through it, the spindle in a direction to lower the wick, and thermostatic means for actuating the latch trigger to release the reset lever, the structural element having a stop that is engaged by a part of the reset lever when the latter is thrown by the spring.

20. In combination with a liquid fuel burner of the wick type, wick adjusting means involving a spindle that is rotatable in one direction to raise the wick and in the opposite direction to lower the wick, spring means tending to rotate the spindle in a direction to lower the wick, a latch for retaining the spring means in ineffective position, said latch involving a trigger, a structural part fixed with respect to the burner, a rocker arm pivoted to said part and cooperating at one end with the latch trigger, and thermostatic means for swinging the rocker arm thereby to actuate the latch.

21. In combination with a liquid fuel burner of the wick type, wick adjusting means involving a spindle that is rotatable in one direction to raise the wick and in the opposite direction to lower the wick, spring means tending to rotate the spindle in the latter direction, a latch for retaining the spring means in ineffective position, said latch involving a trigger that is adapted to be lifted to release the latch, a structural element fixed with respect to the burner, a rocker arm pivotally supported intermediate its ends by said structural element, one end of the rocker arm engaging beneath the latch trigger, and one or more thermostats having stems arranged to depress the opposite end of the rocker arm.

22. In combination with a liquid fuel burner of the wick type, wick lowering means, latch mechanism for retaining said means in ineffective condition, thermostatic means for releasing the latch mechanism, and means for manually adjusting the wick when the wick lowering means is held in ineffective condition.

23. In combination with a liquid fuel burner of the wick type, wick adjusting means involving a spindle that is rotatable in one direction to raise the wick and in the opposite direction to lower the wick, a spring, a friction clutch through which said spring has driving connection with the spindle, the spring tending to rotate the spindle in a direction to lower the wick, latch mechanism for maintaining the spring under tension, a thermostat for releasing the latch, and means for manually rotating the spindle in either direction.

24. In combination with a liquid fuel burner of the wick type, wick adjusting means involving a spindle that is rotatable in one direction to raise the wick and in the opposite direction to lower the wick, means for manually rotating the spindle in either direction, a spring, means through which said spring is adapted to have driving connection with the spindle, the spring when so connected to the spindle serving to rotate the spindle in a direction to lower the wick, latch mechanism for maintaining the spring disconnected from the spindle and under tension, and a thermostat for releasing the latch.

25. In combination with a liquid fuel burner of the wick type, wick adjusting means involving a spindle that is rotatable in one direction to raise the wick and in the opposite direction to lower the wick, means tending to rotate the spindle in the latter direction, a spring actuated latch for retaining said means in ineffective condition, thermostatic means for releasing the latch, and means for manually rotating the spindle in either direction.

26. In combination with a heating device, an element movable in one direction to effect an increase, and in another direction to effect a decrease, in the heat thereof, means tending to move said element in the latter direction, mechanism for maintaining said means in ineffectve condition, a thermostat for actuating said mechanism thereby to render the aforesaid means effective, and further means for manually moving the aforesaid element in either direction while said mechanism maintains the former means in ineffective condition.

27. In combination with a heating device, an element movable in one direction to effect an increase, and in another direction to effect a decrease in the heat thereof, means for manually moving said element in either direction, spring means tending to move said element in the direction to decrease the heat, a latch for maintaining said spring means in ineffective position and under tension, and a thermostat for actuating said latch so as to cause it to release said spring means whereby said spring means is rendered effective.

28. In combination with a liquid fuel burner of the wick type, a thermostat, and mechanism through which the thermostat acts to lower the wick when the temperature of the burner parts becomes excessively high and which tends to restrain the wick against being raised until the temperature of the burner parts drops.

29. In combination with a liquid fuel burner of the wick type, means for raising the wick, means tending to lower the wick and to restrain the wick against being maintained in raised position, latch mechanism for retaining the latter means in ineffective condition, and thermostatic means for releasing the latch.

30. In combination with a liquid fuel burner of the wick type, wick adjusting means involving a spindle that is rotatable in one direction to raise the wick and in the opposite direction to lower the wick, means tending to rotate the spindle in the latter direction, and when in effective condition to restrain the spindle against turning in the former direction, a spring actuated latch for retaining said means in ineffective condition, and thermostatic means for releasing the latch.

31. In water heating apparatus, the combination of a water container, a liquid fuel burner of the wick type situated in operative relation thereto, means involving a thermostat which is subjected to the temperature of the water in said container for lowering the wick when the temperature of the water becomes excessively high and for restraining the wick from being maintained in substantially its former high position until the temperature of the water becomes relatively low.

In testimony whereof, we hereunto affix our signatures.

LEE S. CHADWICK.
MARC RESEK.
J. ALGER DAHLSTROM.